United States Patent
Lee et al.

(10) Patent No.: US 8,229,028 B2
(45) Date of Patent: Jul. 24, 2012

(54) APPARATUS FOR MEASURING IQ IMBALANCE

(75) Inventors: Kyeongho Lee, Seoul (KR); Joonbae Park, Seoul (KR); Jeong Woo Lee, Seoul (KR); Seung-Wook Lee, Seoul (KR); Eal Wan Lee, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 1150 days.

(21) Appl. No.: 12/034,627

(22) Filed: Feb. 20, 2008

(65) Prior Publication Data

US 2009/0028231 A1    Jan. 29, 2009

(51) Int. Cl.
*H04K 1/02* (2006.01)

(52) U.S. Cl. ........ 375/297; 375/219; 375/224; 375/296; 375/298; 375/300; 375/316; 455/67.11; 455/67.13; 455/114.2; 455/114.3; 455/115.1; 455/115.2; 455/295; 455/296

(58) Field of Classification Search .................. 375/224, 375/279–283, 300–308, 219, 296–298, 316; 455/67.11, 67.13, 114.2, 115.1, 115.3, 119, 455/126, 295, 296

See application file for complete search history.

(56) References Cited

U.S. PATENT DOCUMENTS

| | | | |
|---|---|---|---|
| 6,819,910 B2 * | 11/2004 | Shi et al. | 455/126 |
| 7,274,750 B1 * | 9/2007 | Mueller | 375/297 |
| 7,555,051 B2 * | 6/2009 | Zhang | 375/261 |
| 7,925,217 B2 * | 4/2011 | Park et al. | 455/67.11 |
| 2002/0191713 A1 * | 12/2002 | McVey | 375/308 |
| 2004/0203472 A1 * | 10/2004 | Chien | 455/68 |
| 2005/0157815 A1 * | 7/2005 | Kim et al. | 375/302 |
| 2008/0025381 A1 * | 1/2008 | Lee et al. | 375/219 |
| 2008/0205502 A1 * | 8/2008 | Lee et al. | 375/226 |
| 2008/0212662 A1 * | 9/2008 | Lee et al. | 375/224 |

* cited by examiner

*Primary Examiner* — David Ometz
*Assistant Examiner* — Eboni Hughes
(74) *Attorney, Agent, or Firm* — Muir Patent Consulting, PLLC

(57) ABSTRACT

The present invention relates to an apparatus and a method for measuring an in phase and quadrature (IQ) imbalance. One embodiment according to the present general inventive concept can provide a method for measuring a Tx IQ imbalance generated in an IQ up-conversion mixer and an Rx IQ imbalance generated in an IQ down-conversion mixer, that includes measuring a first IQ imbalance corresponding to a first combination of the Rx IQ imbalance with the Tx IQ imbalance, measuring a second IQ imbalance corresponding to a second combination of the Rx IQ imbalance with the Tx IQ imbalance and obtaining the Tx IQ imbalance and the Rx IQ imbalance from the first IQ imbalance and the second IQ imbalance.

19 Claims, 18 Drawing Sheets

(a)

(b)

(c)

(d)

(a)

(b)

(c)

(d)

APPARATUS FOR MEASURING IQ IMBALANCE

This application claims priority under 35 U.S.C. §119 (a) of Korean Patent Application No. 10-2007-0017229, filed on Feb. 21, 2007, in the Korean Intellectual Property Office, the disclosure of which is incorporated herein by reference in its entirety.

FIELD OF THE INVENTION

The present general inventive concept relates to an apparatus and method for measuring an in phase and quadrature (IQ) imbalance.

BACKGROUND OF THE INVENTION

A technique for converting a base band signal (hereinafter referred to as "BB signal") or an intermediate frequency signal (hereinafter referred to as "IF signal") to a radio frequency signal (hereinafter referred to as "RF signal") using an IQ mixer or a technique for converting the RF signal to the BB signal or the IF signal is widely used in a field of a wireless communication.

However, an IQ imbalance occurs in a real IQ mixer. The IQ imbalance can include a gain imbalance that occurs because amplitudes of an in-phase signal and a quadrature signal transmitted from a local oscillator to the IQ mixer are not identical, and/or a phase imbalance that occurs because the in-phase signal and the quadrature signal do not have a phase difference of 90°. When the IQ imbalance occurs, an output of the IQ mixer includes an undesirable noise component, which can result in a degradation of a signal-to-noise ratio.

U.S. Pat. No. 5,949,821 by Shahriar Emami titled "METHOD AND APPARATUS FOR CORRECTING PHASE AND GAIN IMBALANCES BETWEEN IN-PHASE(I) AND QUADRATURE(Q) COMPONENTS OF A RECEIVED SIGNAL BASED ON A DETERMINATION OF PEAK AMPLITUDES" and U.S. Pat. No. 6,044,112 by Johua L. Koslov titled "METHOD AND APPARATUS FOR CORRECTING AMPLITUDE AND PHASE IMBALANCES IN DEMODULATORS" disclose related art methods for compensating for IQ imbalance. The patents disclose methods for measuring the IQ imbalance using a received signal transmitted through a wireless communication. However, since IQ imbalance is measured using the received signal in accordance with the method disclosed by the patents, an accuracy of the measured IQ imbalance is degraded because of noise of a wireless channel included in the received signal.

U.S. Pat. No. 7,151,917 by Tod Paulus titled "APPARATUS AND METHOD FOR DERIVING A DIGITAL IMAGE CORRECTION FACTOR IN A RECEIVER" discloses another related art for compensating for an IQ imbalance. In accordance with the patent, a method for measuring the IQ imbalance inputs a test signal to an IQ down-conversion mixer. However, the technique disclosed by the patent requires a separate test signal and/or does not disclose a Tx IQ.

SUMMARY

An object of embodiments of the application is to solve at least the above problems and/or disadvantages or to provide at least the advantages described herein in whole or in part.

Another object of the present invention is provide an apparatus for measuring an IQ imbalance an IQ mixer.

Another object of the application is to provide an apparatus and a method for measuring a Tx IQ imbalance and/or an Rx IQ imbalance.

Another object of the application is to provide an apparatus and a method for measuring an IQ imbalance wherein an output signal of an IQ up-conversion mixer is inputted to an IQ down-conversion mixer that can simplify a measuring process, and/or reduce noise generated in wireless communication.

Yet another object of the application is to provide an apparatus and a method for measuring an IQ imbalance wherein an LO signal controller is added to be capable of measuring the Rx IQ imbalance and the Rx IQ imbalance.

To achieve objects and/or utilities of embodiments of the application in whole or in part, there is provided a method for measuring a Tx IQ imbalance generated in an IQ up-conversion mixer and an Rx IQ imbalance generated in an IQ down-conversion mixer, the method comprising steps of: (a) measuring a first IQ imbalance corresponding to [the Rx IQ imbalance+the Tx IQ imbalance], (b) measuring a second IQ imbalance corresponding to [the Rx IQ imbalance−the Tx IQ imbalance], and (c) obtaining the Tx IQ imbalance and the Rx IQ imbalance from the first IQ imbalance and the second IQ imbalance.

To also achieve objects and/or utilities of embodiments of the application in whole or in part, there is provided a method for measuring a Tx IQ imbalance generated in an IQ up-conversion mixer and an Rx IQ imbalance generated in an IQ down-conversion mixer, the method comprising steps of: (a) measuring a first IQ imbalance corresponding to [the Tx IQ imbalance+the Rx IQ imbalance], (b) measuring a second IQ imbalance corresponding to [the Tx IQ imbalance−the Rx IQ imbalance], and (c) obtaining the Tx IQ imbalance and the Rx IQ imbalance from the first IQ imbalance and the second IQ imbalance.

To also achieve objects and/or utilities of embodiments of the application in whole or in part, there is provided an apparatus for measuring an IQ imbalance, the apparatus comprising: an IQ up-conversion mixer for outputting a second IQ signal obtained by multiplying a first IQ signal to a first LO signal, an IQ down-conversion mixer for outputting a third IQ signal obtained by multiplying a sum of an I component signal and a Q component signal of the second IQ signal to a second LO signal, wherein an angular frequency of the first LO signal is same as that of the second LO signal, an LO signal controller for changing a sign of one of an in-phase signal and a quadrature signal of the first LO signal and interchanging the in-phase signal and the quadrature signal of the first LO signal according to a control signal, and an IQ imbalance detector for providing the first IQ signal having an angular frequency to the IQ up-conversion mixer, applying the control signal to the LO signal controller, and obtaining a Tx IQ imbalance and an Rx IQ imbalance from the third IQ signal.

To also achieve objects and/or utilities of embodiments of the application in whole or in part, there is provided an apparatus for measuring an IQ imbalance, the apparatus comprising: an IQ up-conversion mixer for outputting a second IQ signal obtained by multiplying a first IQ signal to a first LO signal, an IQ down-conversion mixer for outputting a third IQ signal obtained by multiplying a sum of an I component signal and a Q component signal of the second IQ signal to a second LO signal, wherein an angular frequency of the first LO signal is same as that of the second LO signal, an LO signal controller for changing a sign of one of an in-phase signal and a quadrature signal of the first LO signal and interchanging an in-phase signal and a quadrature signal of the second LO signal according to a control signal, and an IQ imbalance detector for providing the first IQ signal having an angular frequency to the IQ up-conversion mixer, applying the control signal to the LO signal controller, and obtaining a Tx IQ imbalance and an Rx IQ imbalance from the third IQ signal.

To also achieve objects and/or utilities of embodiments of the application in whole or in part, there is provided an apparatus for measuring an IQ imbalance, the apparatus comprising: an IQ up-conversion mixer for outputting a second IQ signal obtained by multiplying a first IQ signal to a first LO signal, an IQ down-conversion mixer for outputting a third IQ signal obtained by multiplying a sum of an I component signal and a Q component signal of the second IQ signal to a second LO signal, wherein an angular frequency of the first LO signal is same as that of the second LO signal, an LO signal controller for changing a sign of one of an in-phase signal and a quadrature signal of the first LO signal, and an IQ imbalance detector for providing the first IQ signal having an angular frequency to the IQ up-conversion mixer, applying the control signal to the LO signal controller, and obtaining a Tx IQ imbalance and an Rx IQ imbalance from the third IQ signal.

To also achieve objects and/or utilities of embodiments of the application in whole or in part, there is provided an apparatus for measuring an IQ imbalance, the apparatus comprising: an IQ up-conversion mixer for outputting a second IQ signal obtained by multiplying a first IQ signal to a first LO signal, an IQ down-conversion mixer for outputting a third IQ signal obtained by multiplying a sum of an I component signal and a Q component signal of the second IQ signal to a second LO signal, wherein an angular frequency of the first LO signal is same as that of the second LO signal, an LO signal controller for changing a sign of one of an in-phase signal and a quadrature signal of the second LO signal and interchanging the in-phase signal and the quadrature signal of the second LO signal according to a control signal, and an IQ imbalance detector for providing the first IQ signal having an angular frequency to the IQ up-conversion mixer, applying the control signal to the LO signal controller, and obtaining a Tx IQ imbalance and an Rx IQ imbalance from the third IQ signal.

To also achieve objects and/or utilities of embodiments of the application in whole or in part, there is provided an apparatus for measuring an IQ imbalance, the apparatus comprising: an IQ up-conversion mixer for outputting a second IQ signal obtained by multiplying a first IQ signal to a first LO signal, an IQ down-conversion mixer for outputting a third IQ signal obtained by multiplying a sum of an I component signal and a Q component signal of the second IQ signal to a second LO signal, wherein an angular frequency of the first LO signal is same as that of the second LO signal, an LO signal controller for changing a sign of one of an in-phase signal and a quadrature signal of the second LO signal and interchanging an in-phase signal and a quadrature signal of the first LO signal according to a control signal, and an IQ imbalance detector for providing the first IQ signal having an angular frequency to the IQ up-conversion mixer, applying the control signal to the LO signal controller, and obtaining a Tx IQ imbalance and an Rx IQ imbalance from the third IQ signal.

To also achieve objects and/or utilities of embodiments of the application in whole or in part, there is provided an apparatus for measuring an IQ imbalance, the apparatus comprising: an IQ up-conversion mixer for outputting a second IQ signal obtained by multiplying a first IQ signal to a first LO signal, an IQ down-conversion mixer for outputting a third IQ signal obtained by multiplying a sum of an I component signal and a Q component signal of the second IQ signal to a second LO signal, wherein an angular frequency of the first LO signal is same as that of the second LO signal, an LO signal controller for changing a sign of one of an in-phase signal and a quadrature signal of the second LO signal and an IQ imbalance detector for providing the first IQ signal having an angular frequency to the IQ up-conversion mixer, applying the control signal to the LO signal controller, and obtaining a Tx IQ imbalance and an Rx IQ imbalance from the third IQ signal.

To also achieve objects and/or utilities of embodiments of the application in whole or in part, there is provided a method for measuring a Tx IQ imbalance generated in an IQ up-conversion mixer and an Rx IQ imbalance generated in an IQ down-conversion mixer, the method including measuring a first IQ imbalance corresponding to a first combination of the Rx IQ imbalance and the Tx IQ imbalance, measuring a second IQ imbalance corresponding to a second combination of the Rx IQ imbalance and the Tx IQ imbalance different from the first combination and obtaining the Tx IQ imbalance and the Rx IQ imbalance from the first IQ imbalance and the second IQ imbalance.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The embodiments will be described in detail with reference to the following drawings in which like reference numerals refer to like elements wherein.

DETAILED DESCRIPTION OF EMBODIMENTS

Embodiments according to the present general inventive concept will be described with reference to the accompanying drawings. Such embodiments are exemplary and not to be construed as limiting. The interpretations of the terms and wordings used in description and claims should not be limited to common or literal meanings. Many alternatives, modifications, and variations will be apparent to those skilled in the art.

Figure 1:
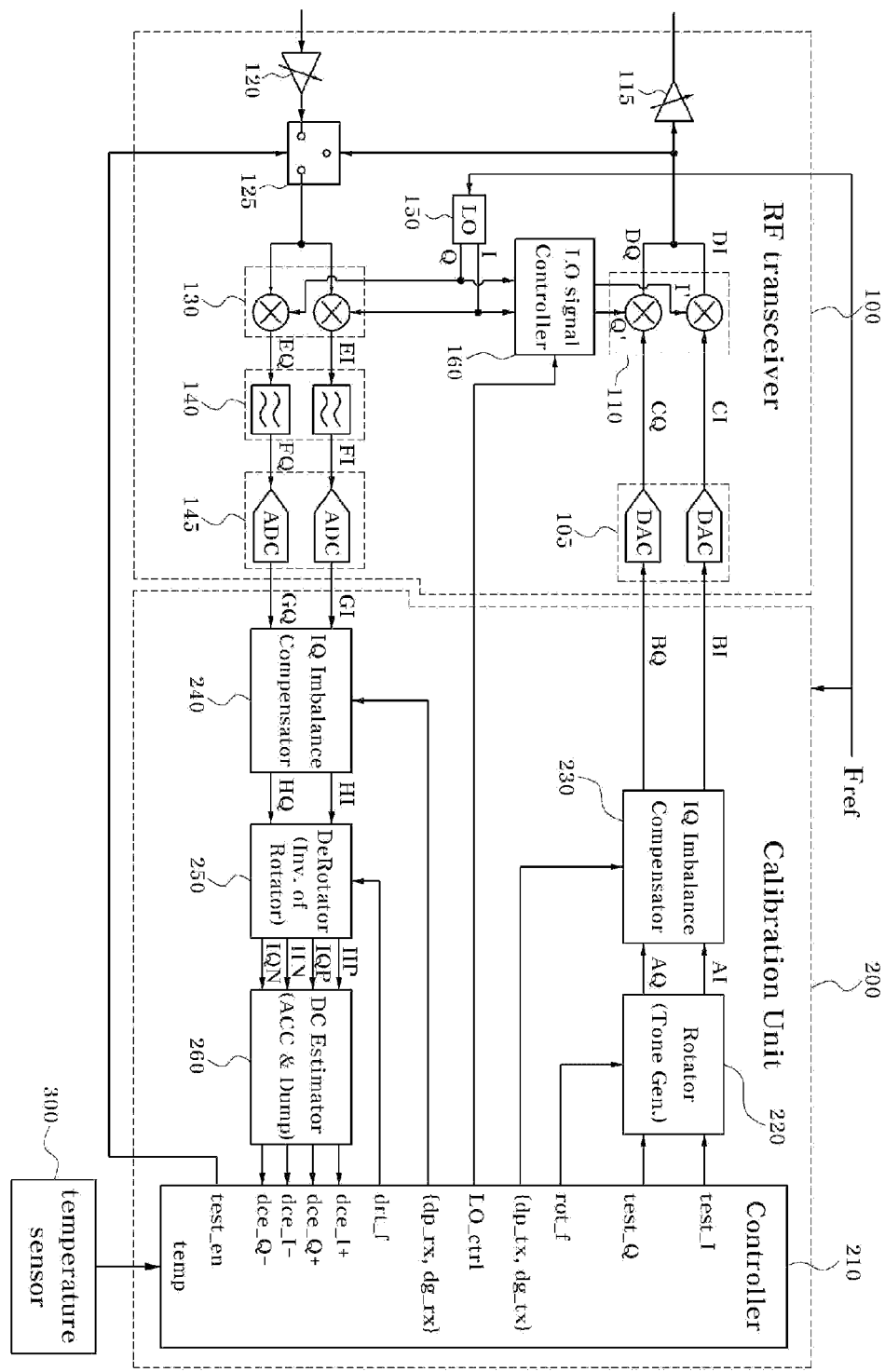
FIG. 1 is a diagram illustrating a transceiving circuit in accordance with a first embodiment of the application.

FIG. 1 is a diagram illustrating a transceiving circuit in accordance with an embodiment of the application. As illustrated in FIG. 1, the transceiving circuit can include an RF transceiver 100 and a calibration unit 200.

The RF transceiver 100 can include an IQ DAC (IQ digital-to-analog converter) 105, an IQ up-conversion mixer 110, a power amplifier 115, a low noise amplifier 120, a feedback switch 125, an IQ down-conversion mixer 130, an IQ filter 140, an IQ ADC (IQ analog-to-digital converter) 145, a local oscillator 150 and a LO signal controller 160.

The IQ DAC 105 converts digital IQ signals BI and BQ being outputted from the calibration unit 200 to an analog IQ signal. The IQ DAC 105 may include two DACs, wherein one of the DACs is an I channel DAC and the other is a Q channel DAC. An exemplary circuit including the I channel DAC and the Q channel DAC will be referred to as the IQ DAC 105. Similarly, an exemplary circuit including an I channel up-conversion mixer and a Q channel up-conversion mixer will be referred to as the IQ up-conversion mixer 110, and a circuit including an I channel down-conversion mixer and a Q channel down-conversion mixer will be referred to as the IQ down-conversion mixer 130. In addition, exemplary circuits such as a circuit including an I channel filter and a Q channel filter will be referred to as the IQ filter 140, and a circuit including an I channel ADC and a Q channel ADC will be referred to as the IQ ADC 145.

The IQ up-conversion mixer 110 up-converts IQ signals CI and CQ transmitted from the IQ DAC 105 to IQ signals DI and DQ, for example, of an RF band. In order to achieve this, the IQ up-conversion mixer 110 combines or multiplies the I channel signal CI and the Q channel signal CQ being outputted from the IQ DAC 105 to an in-phase signal I' and a quadrature signal Q' being outputted from the signal controller 160, respectively.

The power amplifier 115 amplifies a transmission signal (e.g., RF) corresponding to a sum of IQ outputs DI and DQ of the IQ up-conversion mixer 110. The amplified transmission RF signal may be transmitted to an antenna (not shown) or the like via a duplexer (not shown) for instance.

The low noise amplifier 120 subjects a received signal (e.g., RF signal) to a low-noise amplification. The received RF signal may be transmitted to the low noise amplifier 120 via the antenna and the duplexer for instance.

The feedback switch 125 can form a feedback loop between a transmission path and a reception path. For example, the feedback switch 125 can feed back the transmission REF signal to the IQ down-conversion mixer 130 during an IQ imbalance measurement period and feed the received RF signal back to the IQ down-conversion mixer 130 during a normal operating period. While an exemplary feedback path formed between an input stage of the power amplifier 115 and an output stage of the low noise amplifier 120 is shown, various modifications are possible to transmit the transmission signal (e.g., RF signal) to the IQ down-conversion mixer 130. For instance, when the feedback path may be formed between an output stage of the power amplifier 115 and an input stage of the low noise amplifier 120. The feedback switch 125 may be controlled by a control signal (e.g., test_en) from a controller 210.

The IQ down-conversion mixer 130 converts the RF signal transmitted from the feedback switch 125 to a BB signal or an IF signal. In order to achieve this, the IQ down-conversion mixer 130 multiplies the RF signal transmitted from the feedback switch 125 to an in-phase signal I and multiplies the RF signal transmitted from the feedback switch 125 to a quadrature signal Q.

The IQ filter 140 is preferably disposed between the IQ down-conversion mixer 130 and the IQ ADC 145, and may include a low pass filter, a band pass filter or the like.

The IQ ADC 145 converts analog signals FI and FQ being outputted from the IQ filter 140 to digital signals GI and GQ.

The local oscillator 150 can generate the in-phase signal I and the quadrature signal Q (hereinafter "LO signal").

The LO signal controller 160 can transmit the LO signals I' and Q' corresponding to the LO signals I and Q being outputted from the local oscillator 150 to the IQ up-conversion mixer 110. In one embodiment, signs of a phase error and a gain error of the LO signals I' an Q' transmitted to the IQ up-conversion mixer may be changed according to a control signal (e.g., control signal LO_ctrl) that may be transmitted from the controller 210. For instance, the LO signals I and Q being outputted from the local oscillator 150 can be transmitted to the IQ up-conversion mixer 110 as is (i.e., I'=I and Q'=Q) during a normal operating period and a first test period, and one of the signs of the LO signals I and Q being outputted from the local oscillator 150 are changed and the quadrature signal and the in-phase signal are interchanged (i.e., I'=Q, Q'=-I or I'=-Q, Q'=I) during a second test period.

The calibration unit 200 may include a signal generators 220 and 230, and an IQ imbalance detectors 210, 240, 250 and 260. For example, the calibration unit 200 can include the controller 210, a rotator 220, a Tx IQ imbalance compensator 230, an Rx IQ imbalance compensator 240, a derotator 250 and a DC estimator 260. It is preferable that a clock signal being inputted to the calibration unit 200 and a clock signal being inputted to the first local oscillator 150 are from a single clock source. As a result, a derotating frequency carried out in the derotator 250 may be controlled. The calibration unit 200 may be embodied in various ways. For example, in one embodiment, the controller 210, the rotator 220, the Tx IQ imbalance compensator 230, the Rx IQ imbalance compensator 240, the derotator 250 and the DC estimator 260 may be embodied by separate digital circuits. In another embodiment, the calibration unit 200 may be embodied using a DSP (digital signal processor) or an MCU (microcontroller unit). In such case, each of the controller 210, the rotator 220, the Tx IQ imbalance compensator 230, the Rx IQ imbalance compensator 240, the derotator 250 and the DC estimator 260 may stand for an operation (or one or more operations) carried out by the DSP or MCU.

The controller 210 can control the feedback switch 125, the LO signal controller 160, the rotator 220, the Tx IQ imbalance compensator 230, the Rx IQ imbalance compensator 240, the derotator 250 and the DC estimator 260 in order to measure the IQ imbalance. The controller 210 may receive a signal temp corresponding to a temperature from a temperature sensor 300 to re-carry out a process of measuring the IQ imbalance in accordance with a temperature change. For example, the IQ balance may be measured periodically, when a temperature change is greater than a prescribed amount, based on operator command or the like.

The rotator 220 rotates IQ signals (e.g., test_I and test_Q of a DC component) by an amount of predetermined frequency to generate a tone. The predetermined frequency can be determined by a control signal (e.g., control signal rot_f) transmitted from the controller 210. During the normal operating period, the rotator 220 is not in operation. For example, during this period, the rotator 220 outputs the IQ signals test_I and test_Q without the rotation. The rotator 220 can generate the predetermined tone during the period of measuring the IQ imbalance.

The Tx IQ imbalance compensator 230 can compensate for the Tx IQ imbalance. For instance, the Tx IQ imbalance compensator 230 is not in operation during the period of measuring the IQ imbalance (e.g., outputs the signal transmitted from the rotator 220 as is), and is in operation during the normal operating period. In addition, it is preferable that a signal to be transmitted via the antenna during the normal operating period is transmitted to the power amplifier 115 via the Tx IQ imbalance compensator 230, the IQ DAC 105 and the IQ up-conversion mixer 110.

The Rx IQ imbalance compensator 240 can compensate for the Rx IQ imbalance. For instance, the Rx IQ imbalance compensator 240 is not in operation during the period of measuring the Rx IQ imbalance (e.g., outputs the signal transmitted from the IQ ADC 145 as is), and is in operation during the normal operating period. It is preferable that a signal received via the antenna during the normal operating period is compensated for the Rx IQ imbalance via the Rx IQ imbalance compensator 240.

The derotator 250 can derotate signals HI and HQ being outputted from the Rx IQ imbalance compensator 240 by an amount of a predetermined frequency. For instance, the derotator 250 is not in operation during the normal operating period (e.g., outputs a signal transmitted from the Rx IQ imbalance compensator 240 without the rotation). During the period of measuring the IQ imbalance, the derotator 250 can derotate the IQ signals HI and HQ being inputted thereto to output IQ signals IIP and IQP obtained by derotating the IQ signals HI and HQ by an amount of $\Delta F$ and IQ signals IIN and IQN obtained by derotating the IQ signals HI and HQ by an amount of $-\Delta F$, where $\Delta F$ is a frequency of a signal generated in the rotator 220.

The DC estimator 260 can determine or extract a DC component of the IQ signals IIP, IQP, IIN and IQN being outputted from the derotator 250. The DC estimator 260 may be embodied using the low pass filter, an accumulator or the like. When the low pass filter is used, each input signal can be outputted after passing through the low pass filter. When the accumulator is used, each input signal can be outputted by passing through the accumulator.

Figure 2:
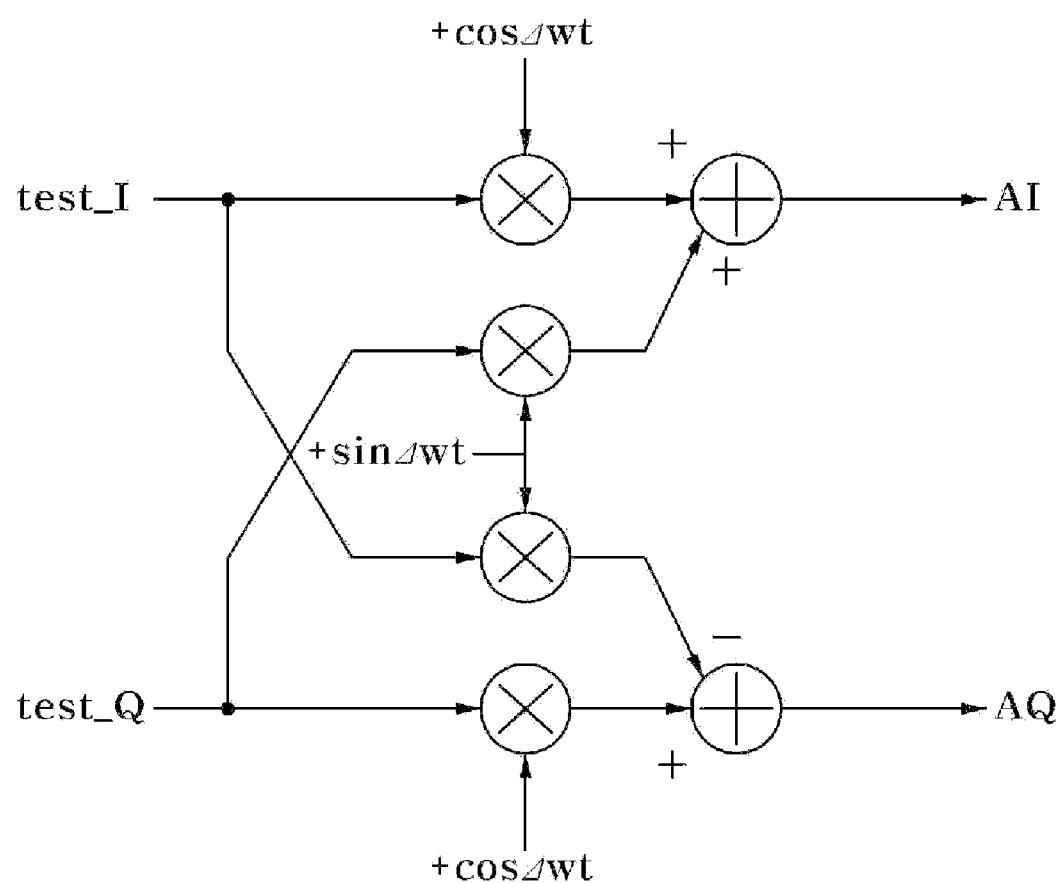
FIG. 2 is a diagram illustrating an example of a rotator of FIG. 1.

FIG. 2 is a diagram illustrating an example of a rotator, which may be used for the rotator 220 of FIG. 1. As illustrated in FIG. 2, the rotator 220 can include four adders, one multiplier and one subtractor. The rotator 220 carries out an operation expressed in equation 1, for example by including components shown.

$$AI=(test\_I \times \cos(\Delta \omega \times t))+(test\_Q \times \sin(\Delta \omega \times t))$$

$$AQ=(test\_Q \times \cos(\Delta \omega \times t))-(test\_I \times \sin(\Delta \omega \times t)) \quad \text{[Equation 1]}$$

In accordance with Equation 1, $\Delta \omega$ represents an angular frequency of the tone that is to be outputted by the rotator 220. The controller 210 can output a control signal (e.g., a control signal rot_f) that sets $\Delta \omega$ to non-zero (an negative value as well as a positive value) during the period of measuring the IQ imbalance.

Since a function of the rotator 220 is to generate the tone having the predetermined angular frequency, a constitution of the rotator 220 is not limited to FIG. 2. For instance, the rotator 220 may be configured to simply output $\cos(\Delta \omega \times t)$ and $-\sin(\Delta \omega \times t)$.

Figure 3:
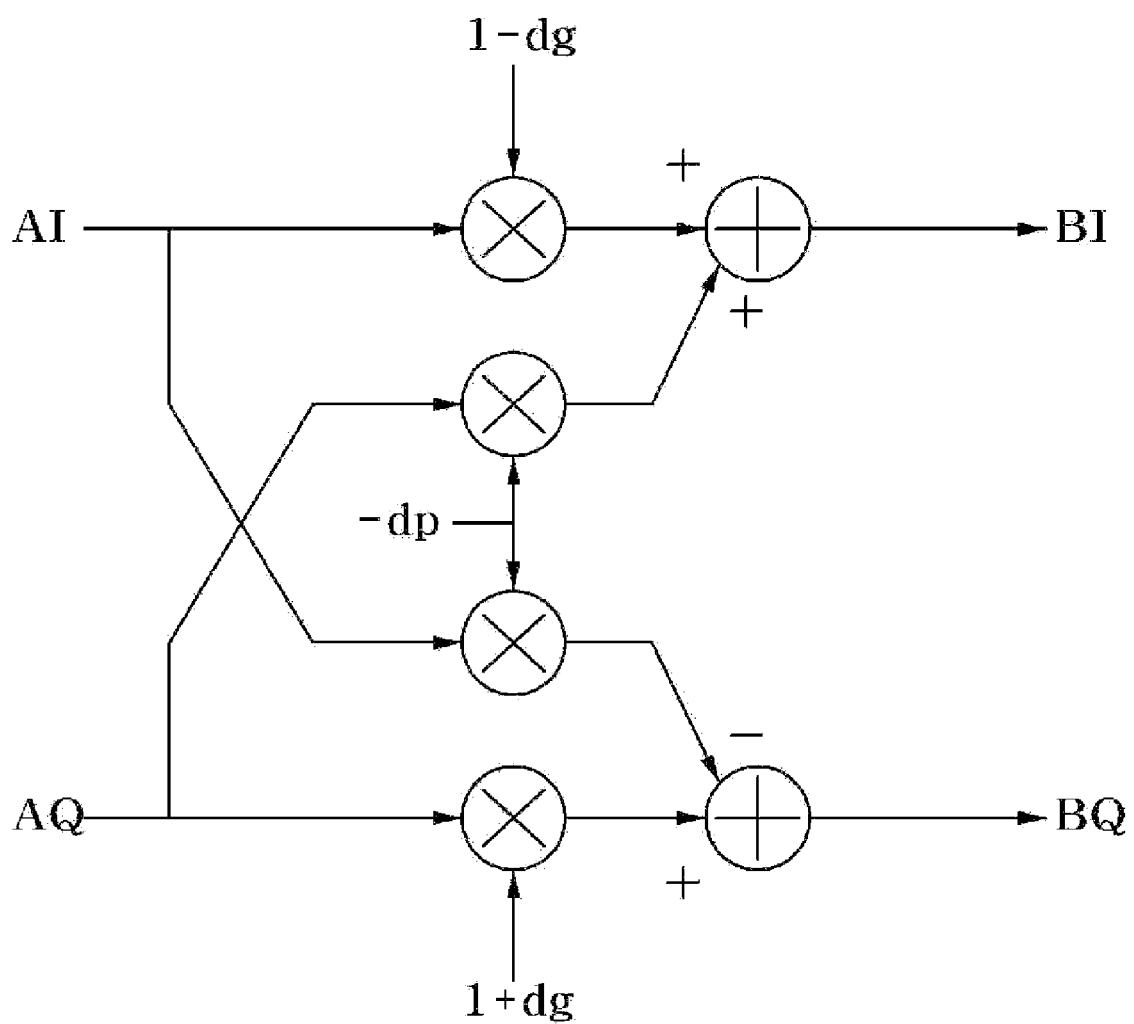
FIG. 3 is a diagram illustrating an example of a Tx IQ imbalance compensator of FIG. 1.

FIG. 3 is a diagram illustrating an example of a compensator, which may be used for the Tx IQ imbalance compensator 230 of FIG. 1. As illustrated in FIG. 3, the Tx IQ imbalance compensator 230 can include four adders and two multipliers. The Tx IQ imbalance compensator 230 carries out an operation expressed in equation 2, for example by including components shown.

$$BI=(AI \times (1-dg))-(AQ \times dp)$$

$$BQ=(AQ \times (1+dg))-(AI \times dp) \quad \text{[Equation 2]}$$

In Equation 2, dg represents a value corresponding to a control signal (e.g., control signal dg_tx) transmitted from the controller 210, which corresponds to a gain error due to the Tx IQ imbalance, and dp represents a value corresponding to a control signal (e.g., control signal dp_tx) transmitted from the controller 210, which corresponds to a phase error due to the Tx IQ imbalance. A constitution of the Tx IQ imbalance compensator 230 shown in FIG. 3 is an example of a compensator when the IQ output signals DI and DQ of the IQ up-conversion mixer 110 are illustrated in Equation 3.

$$DI=CI \times (1+dg) \times \cos(\omega t-dp)$$

$$DQ=CQ \times (1-dg) \times \sin(\omega t+dp) \quad \text{[Equation 3]}$$

In Equation 3, $\omega$ can represent an angular frequency of the in-phase signal I' and the quadrature signal Q' being inputted to the IQ up-conversion mixer 110.

However, the constitution of the Tx IQ imbalance compensator 230 is not limited to that of FIG. 3, and for example, may be varied as expressed in Equations 4 and 5.

$$BI=AI-(AQ \times dp)$$

$$BQ=(AQ-(AI \times dp)) \times (1+2 \times dg) \quad \text{[Equation 4]}$$

$$BI=(AI-(AQ \times dp)) \times (1-2 \times dg)$$

$$BQ=AQ-(AI \times dp) \quad \text{[Equation 5]}$$

The Rx IQ imbalance compensator 240 may be configured similar to the Tx IQ imbalance compensator 230. However, in the Rx IQ imbalance compensator 240, dg is a value corresponding to a control signal (e.g., a control signal dg_rx) transmitted from the controller 210 that corresponds to the gain error due to the Rx IQ imbalance while dp is a value corresponding to a control signal (e.g., a control signal dp_rx) transmitted from the controller 210 that corresponds to the phase error due to the Rx IQ imbalance.

Figure 4:
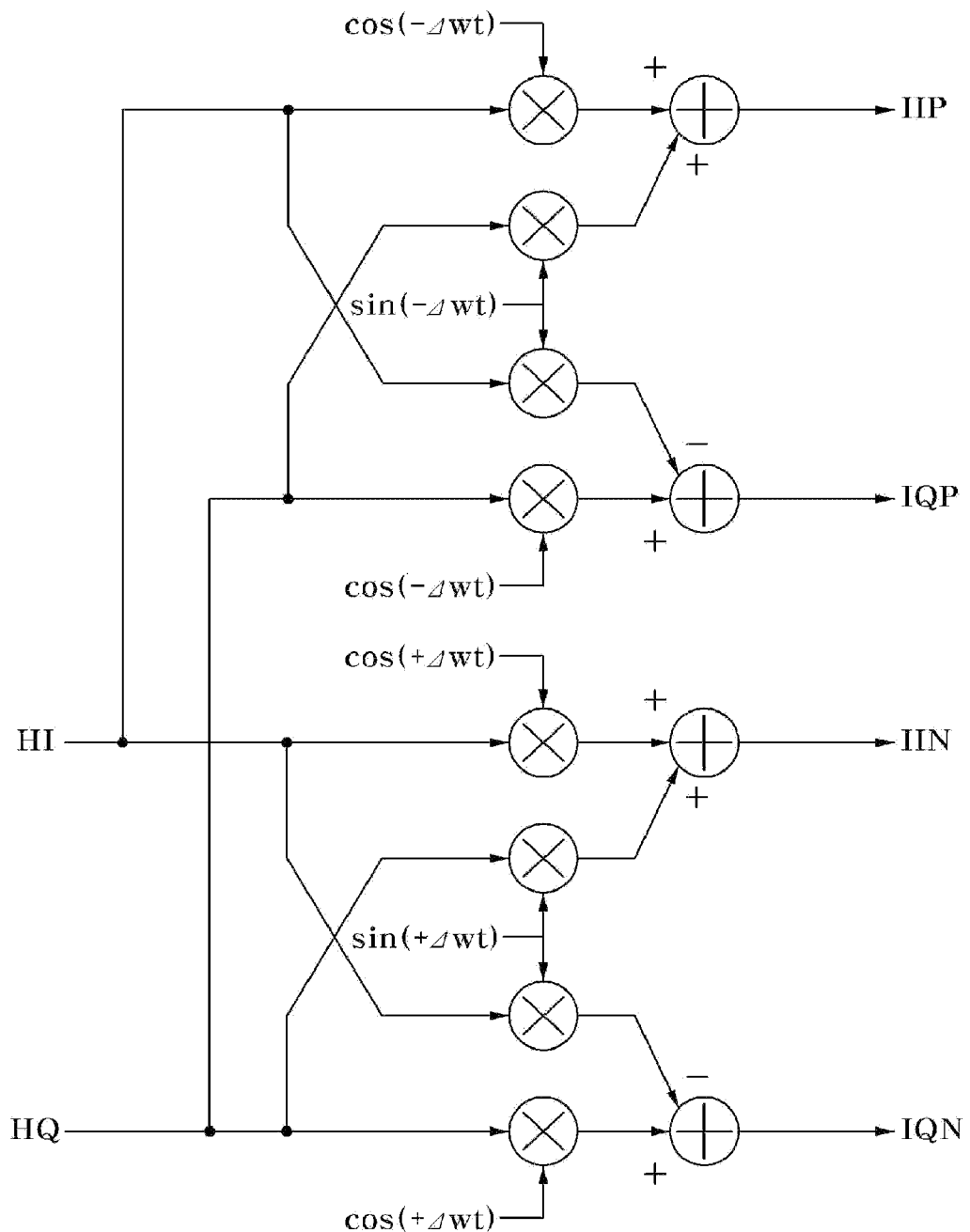
FIG. 4 is a diagram illustrating an example of a derotator of FIG. 1.

FIG. 4 is a diagram illustrating an example of a derotator, which may be used for the derotator 250 of FIG. 1. As illustrated in FIG. 4, the derotator 250 comprises eight multipliers, two adders and two subtractors. The derotator 250 carries out an operation expressed in equation 6, for example by including components shown.

$$IIP=(HI \times \cos(-\Delta \omega \times t))+(HQ \times \sin(-\Delta \omega \times t))$$

$$IQP=(HQ \times \cos(-\Delta \omega \times t))-(HI \times \sin(-\Delta \omega \times t))$$

$$IIN=(HI\times\cos(\Delta\omega\times t))+(HQ\times\sin(\Delta\omega\times t))$$

$$IQN=(HQ\times\cos(\Delta\omega\times t))-(HI\times\sin(\Delta\omega\times t)) \quad \text{[Equation 6]}$$

The controller 210 can output a control signal (e.g., a control signal drt_f) during the period of measuring the IQ imbalance so that $\Delta\omega$ is the angular frequency of the tone generated by the rotator 220.

Therefore, IIP and IQP obtained by derotating the input signals HI and HQ by an amount of $\Delta\omega$ can correspond to signals without the IQ imbalance (hereinafter "wanted signal"), and IIN and IQN obtained by derotating the input signals HI and HQ by an amount of $-\Delta\omega$ can correspond to image signals generated due to the IQ imbalance (hereinafter "image signal").

Since IIP and IQP can include a signal (having an angular frequency of $\Delta\omega$) other than the wanted signal, IIN and IQN can include a signal (having the angular frequency of $\Delta\omega$) other than the image signal, such high frequency signals should be removed by the DC estimator 260 that receives the output of the derotator 250.

The derotator 250 may be variously or diversely embodied. For instance, a number of the multipliers and the adders may be reduced through multiplexing. For example, a single rotator may be used to embody the DC estimator 260 instead of two rotators in contrast to an embodiment illustrated in FIG. 4. In such case, IIP and IQP obtained by derotating the input signals HI and HQ by $\Delta\omega$ can be outputted during a first test period, and IIN and IQN obtained by derotating the input signals HI and HQ by $-\Delta\omega$ can be outputted during a second test period.

Figure 5:
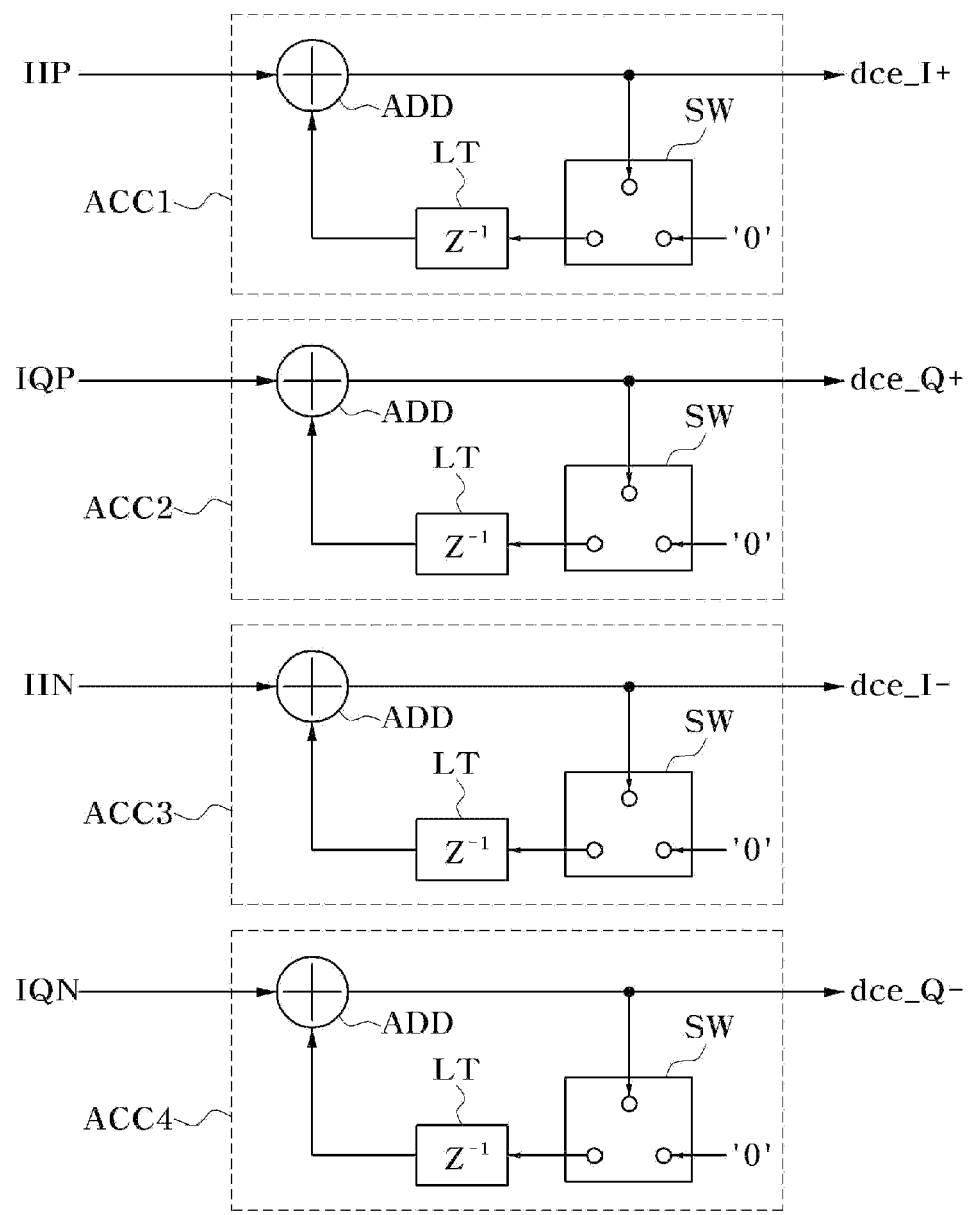
FIG. 5 is a diagram illustrating an example where an accumulator includes a DC estimator.

FIG. 5 is a diagram illustrating an example where an accumulator is used as the DC estimator 260 of FIG. 1. As illustrated in FIG. 5, the DC estimator 260 can include four accumulators ACC1, ACC2, ACC3 and ACC4. Each of the accumulators ACC1, ACC2, ACC3 and ACC4; preferably outputs a result obtained by accumulating the input signal IIP, IQP, IIN or IQN. In order to achieve this, each of the accumulators ACC1, ACC2, ACC3 and ACC4 may comprise an adder Add, a switch SW and a latch LT.

However the DC estimator 260 may reduce a number of the accumulators via multiplexing similar to the derotator 250.

Figure 6:
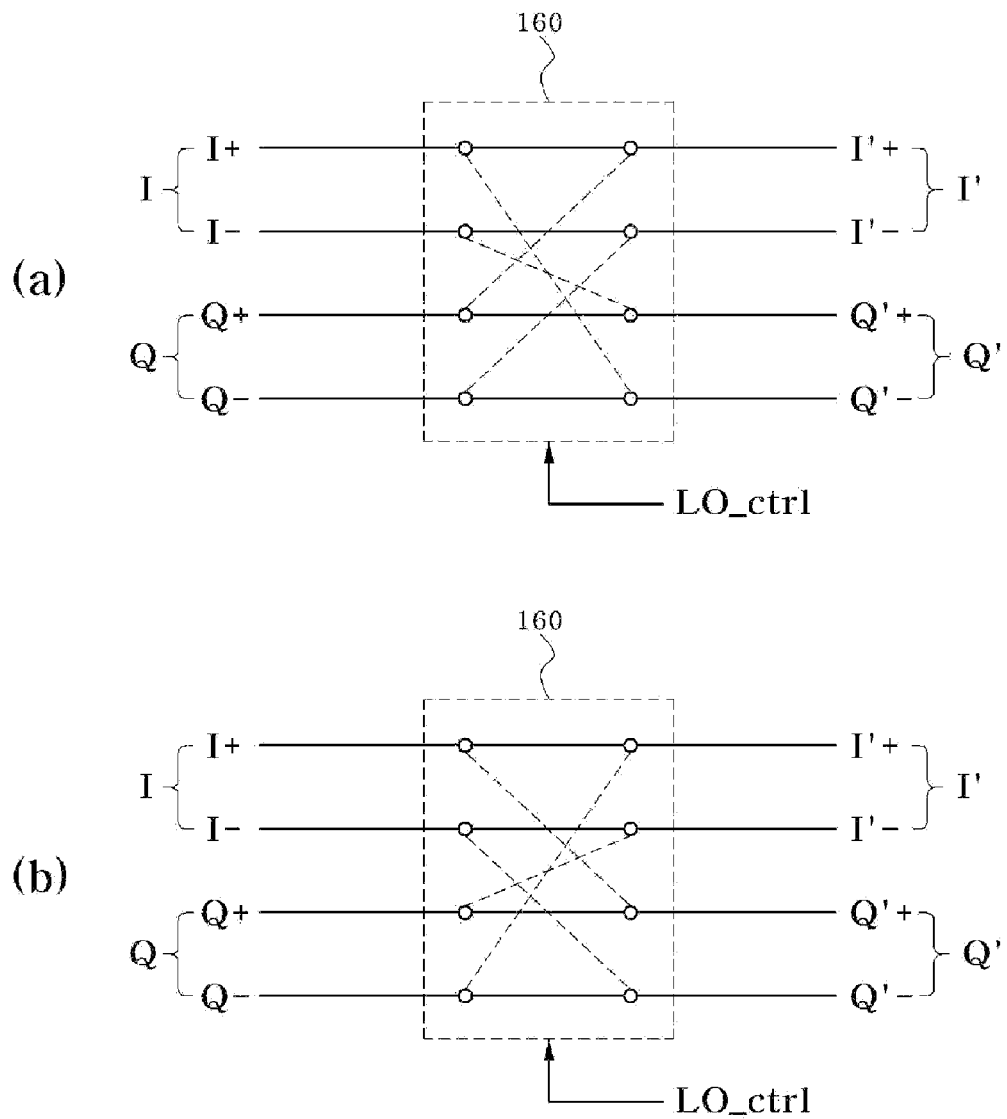
FIG. 6 is a diagram illustrating a principle for measuring an Rx IQ imbalance in accordance with the present invention.

FIGS. 6(a)-(b) are diagrams illustrating an example of a signal controller that can be used for a LO signal controller 160 of FIG. 1.

FIG. 6a illustrates an example where the LO signals I and Q being outputted from the local oscillator 150 are transmitted to the IQ up-conversion mixer 110 as is (e.g., I'=I and Q'=Q; the LO signal controller 160 is connected as shown in a solid line) during the normal operating period and the first test period, and the sign of the in-phase signal I of the LO signals I and Q being outputted from the local oscillator 150 is changed and the quadrature signal and the in-phase signal are interchanged (e.g., I'=Q, Q'=−I; the LO signal controller 160 is connected as shown in a dotted line) during a second test period. As shown in FIG. 6(a), I+ and I− represent two signals constituting the in-phase signal I that is an differential signal, Q+ and Q− represent two signals constituting the quadrature signal Q that is the differential signal, I'+ and I'− represent two signals constituting the in-phase signal I' that is the differential signal, and Q'+ and Q'− represent two signals constituting the quadrature signal Q' that is the differential signal. However, the present general inventive concept is not intended to be so limited.

The IQ signals I' and Q' being inputted to the IQ up-conversion mixer 110 during the first test period may be expressed as equation 7, and the IQ signals I' and Q' being inputted to the IQ up-conversion mixer 110 during the second test period may be expressed as equation 8.

$$I'=I=(1+dg)\times\cos(\omega\times t-dp)$$

$$Q'=Q=(1-dg)\times\sin(\omega\times t+dp) \quad \text{[Equation 7]}$$

$$I'=Q=(1-dg)\times\sin(\omega\times t+dp)=(1-dg)\times\cos(\omega\times t-2/\pi+dp)$$

$$Q'=-I=-(1+dg)\times\cos(\omega\times t-dp)=(1+dg)\times\sin(\omega\times t-2/\pi-dp) \quad \text{[Equation 8]}$$

In accordance with equations 7 and 8, the signs of the phase error and the gain error of the Tx IQ imbalance during the first test period are different from those of the phase error and the gain error of the Tx IQ imbalance during the second test period, respectively.

FIG. 6b illustrates an example wherein the LO signals I and Q being outputted from the local oscillator 150 are transmitted to the IQ up-conversion mixer 110 as is (e.g., I'=I and Q'=Q; the LO signal controller 160 is connected as shown in the solid line) during the normal operating period and the first test period, and the sign of the quadrature signal Q of the LO signals I and Q being outputted from the local oscillator 150 is changed and the quadrature signal and the in-phase signal are interchanged (e.g., I'=−Q, Q'=I; the LO signal controller 160 is connected as shown in the dotted line) during a second test period.

The IQ signals I' and Q' being inputted to the IQ up-conversion mixer 110 during the first test period may be expressed as equation 9, and the IQ signals I' and Q' being inputted to the IQ up-conversion mixer 110 during the second test period may be expressed as equation 10.

$$I'=I=(1+dg)\times\cos(\omega\times t-dp)$$

$$Q'=Q=(1-dg)\times\sin(\omega\times t+dp) \quad \text{[Equation 9]}$$

$$I'=-Q=-(1-dg)\times\sin(\omega\times t+dp)=(1-dg)\times\cos(\omega\times t+2/\pi+dp)$$

$$Q'=I=(1+dg)\times\cos(\omega\times t-dp)=(1+dg)\times\sin(\omega\times t+2/\pi-dp) \quad \text{[Equation 10]}$$

In accordance with equations 9 and 10, the signs of the phase error and the gain error of the Tx IQ imbalance during the first test period are different from those of the phase error and the gain error of the Tx IQ imbalance during the second test period, respectively.

Figure 7:
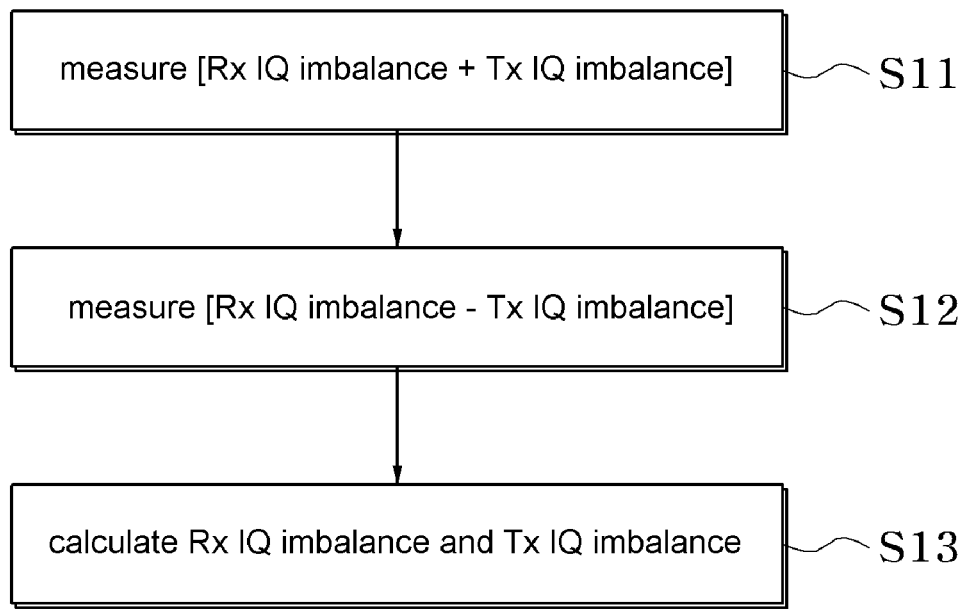
FIG. 7 is a diagram illustrating a method for measuring an IQ imbalance in accordance with the application.

FIG. 7 is a diagram illustrating a method embodiment for measuring an IQ imbalance in accordance with the application. Referring to FIG. 7, the method for measuring the IQ imbalance can include measuring a first IQ imbalance, for example corresponding to [an Rx IQ imbalance+a Tx IQ imbalance] (block S11), measuring a second IQ imbalance, for example corresponding to [the Rx IQ imbalance−the Tx IQ imbalance] (block S12), and obtaining the Tx IQ imbalance and the Rx IQ imbalance from the first IQ imbalance and the second IQ imbalance (block S13). However, the present application is not intended to be so limited, for example, an order of block S11 and S12 may be interchanged.

The block S11 can correspond to the first test period, and the first IQ imbalance measured during the first test period may be expressed as equation 11.

$$dg\_tr+=dg\_r+dg\_t$$

$$dp\_tr+=dp\_r+dp\_t \quad \text{[Equation 11]}$$

dg_tr+ and dp_tr+ represent the gain error and the phase error of the first IQ imbalance, respectively, dg_t and dp_t represent the gain error and the phase error of the Tx IQ imbalance, respectively, and dg_r and dp_r represent the gain error and the phase error of the Rx IQ imbalance, respectively in equation 11.

The block S12 can correspond to the second test period, and the second IQ imbalance (e.g., gain error and phase error) measured during the second test period may be expressed as equation 12.

$$dg\_tr-=dg\_r-dg\_t$$

$$dp\_tr-=dp\_r-dp\_t \quad \text{[Equation 12]}$$

In the step S13, the Tx IQ imbalance dg_t and dp_t and the Rx IQ imbalance dg_r and dp_r may be obtained from the first IQ imbalance dg_tr+, dp_tr+ obtained in the block S11 and the second IQ imbalance dg_tr−, dp_tr− obtained in the block S12 as expressed in equation 13.

$$dg\_t=(dg\_tr+-dg\_tr-)/2$$

$$dp\_t=(dp\_tr+-dp\_tr-)/2$$

$$dg\_r=(dg\_tr++dg\_tr-)/2$$

$$dp\_r=(dp\_tr++dp\_tr-)/2 \quad \text{[Equation 13]}$$

Figure 8:
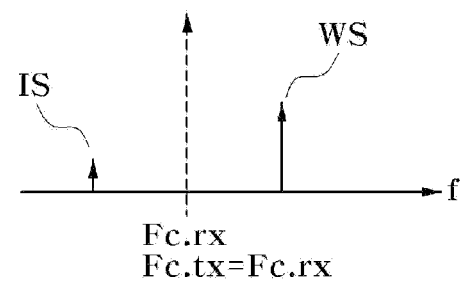
FIG. 8 is a diagram illustrating a principle for measuring a first IQ imbalance (first test period) of FIG. 7 in accordance with the present general inventive concept.
Figure 8:
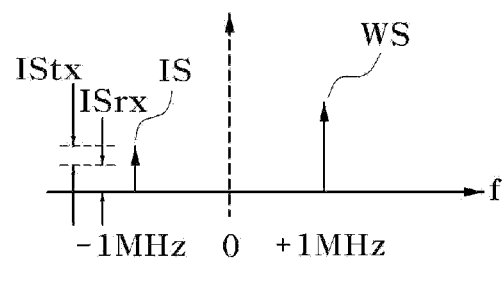
Figure 8:
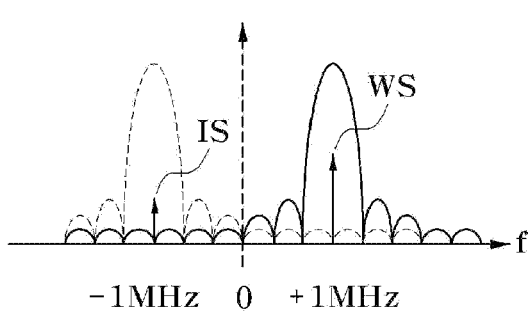
Figure 8:
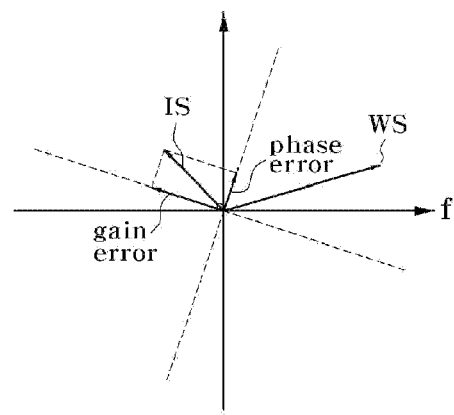

FIG. 8 is a diagram illustrating exemplary operations for measuring the first IQ imbalance (e.g., the first test period, block S11) of FIG. 7. A method embodiment for measuring the IQ imbalance is described using and may be applied to the embodiment of FIG. 1, however, such a method embodiment is not intended to be limited thereby.

In order to measure the IQ imbalance, the rotator 220 generates the predetermined tone (e.g., the tone of 1 MHz in this embodiment), and the Tx IQ imbalance compensator 230 is not in operation. The rotator 220 can carry out an rotation of a predetermined frequency ΔF while the control signals rot_f, dp_tx and dg_tx are applied so that the Tx IQ imbalance is not compensated for in the Tx IQ imbalance compensator 230, and test_I and test_Q of the DC component is outputted from the controller 210. Therefore, the IQ signals BI and BQ of the DC component are inputted to the IQ DAC 105. In addition, the control signal test_en is applied to the feedback switch 125 so as to form the feedback path, and a control signal LO_ctrl is applied to the LO signal controller 160 so that the output of the local oscillator LO is inputted to the IQ up-conversion mixer 110 as is. Moreover, the control signals dp_rx and dg_rx are applied so that the Rx IQ imbalance compensator 240 does not operate. The control signal drt_f is applied to the derotator 250 so that the derotator 250 outputs the IQ signals IIP and IQP can be obtained by derotating the input IQ signals HI and HQ by an amount of ΔF, and the IQ signals IIN and IQN can be obtained by derotating the input IQ signals HI and HQ by an amount of −ΔF.

FIG. 8(a) illustrates the output signal of the IQ up-conversion mixer 110. As shown, Fc.tx represents the frequency of the LO signals I' and Q' transmitted to the IQ up-conversion mixer 110, and Fc.rx represents the frequency of the LO signals I and Q transmitted to the IQ down-conversion mixer 130. Since the IQ signals CI and CQ of the predetermined tone are inputted to the IQ up-conversion mixer 110, the IQ output signals DI and DQ of the IQ up-conversion mixer 110 include the wanted signal WS and the image signal IS due to the IQ imbalance.

FIG. 8(b) illustrates the output signal of the IQ down-conversion mixer 130. As shown, the desired signal WS is positioned at ΔF, e.g. 1 MHz, and the image signal IS is positioned at −ΔF, e.g. −1 MHz. The image signal IS corresponds to a sum of the image signal IStx due to the Tx IQ imbalance (the image signal generated in the IQ up-conversion mixer 110) and the image signal ISrx due to the Rx IQ imbalance (IStx, the image signal generated in the IQ down-conversion mixer 130), i.e. the image signal due to the Tx/Rx IQ imbalance. Therefore, when the output signal of the IQ down-conversion mixer 130 is derotated by the amount of ΔF, e.g. 1 Mhz and the DC signal is then extracted, the wanted signal WS may be obtained. Moreover, when the output signal of the IQ down-conversion mixer 130 is derotated by the amount of −ΔF, e.g. −1 Mhz and the DC signal is then extracted, the image signal IS may be obtained. The derotation and the extraction of the DC signal can be carried out by the derotator 250 and the DC estimator 260, respectively.

FIG. 8(c) illustrates an exemplary filter characteristic of the derotator 250 and the DC estimator 260. In accordance with the filter characteristic denoted as a solid line in case of the derotation of by the amount of ΔF, e.g. +1 MHz, the wanted signal WS can be passed and the image signal IS can be blocked. In addition, in accordance with the filter characteristic denoted as a dotted line in case of the derotation of by the amount of −ΔF, e.g. −1 MHz, the image signal IS can be passed and the wanted signal WS can be blocked. That is, a separate sharp analog filter is not required to select the wanted signal WS and the image signal IS when the derotator 250 and the DC estimator 260 are used.

FIG. 8(d) illustrates the vectors being outputted from the DC estimator 260, e.g. the vectors IIP and IQP of the wanted signal WS and the vectors IIN and IQN of the image signal IS. The vectors IIN and IQN of the image signal IS may be expressed in terms of IIP and IQP, for example as shown in equation 14.

$$[IIN,IQN]=(dg\_r+dg\_t)[IIP,-IQP]+(dp\_r+dp\_t)\\ [IQP,IIP] \quad \text{[Equation 14]}$$

As expressed in equation 14, the vectors of the image signal IS corresponds to a sum of two vectors, i.e. (dg_r+dg_t)[IIP, −IQP] and (dp_r+dp_t)[IQP, IIP]. Therefore, the gain error dg_tr+ and the phase error dp_tr+ of the first IQ imbalance may easily be obtained through a vector operation such as equation 15.

$$dg\_tr+=(dg\_r+dg\_t)=([IIN,IQN]\cdot[IIP,-IQP])/(IIP2+IQP2)$$

$$dp\_tr+=(dp\_r+dp\_t)=([IIN,IQN]\cdot[IQP,IIP])/(IIP2+IQP2) \quad \text{[Equation 15]}$$

"·" in equation 15 represents a scalar product. Operations expressed in equation 15, for example, may be carried out by the controller 210.

Figure 9:
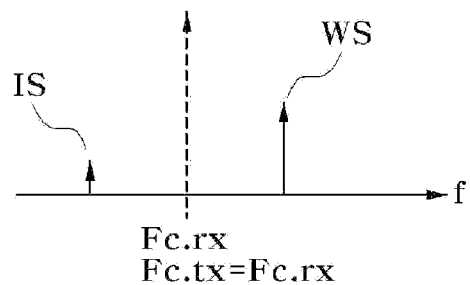
FIG. 9 is a diagram illustrating a principle for measuring a second IQ imbalance (second test period) of FIG. 7 in accordance with the present general inventive concept.
Figure 9:
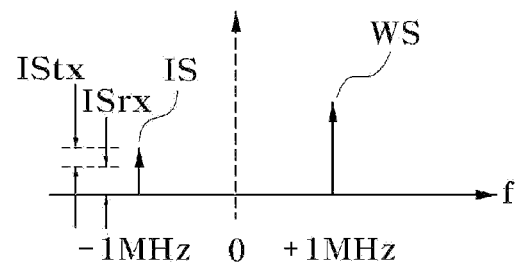
Figure 9:
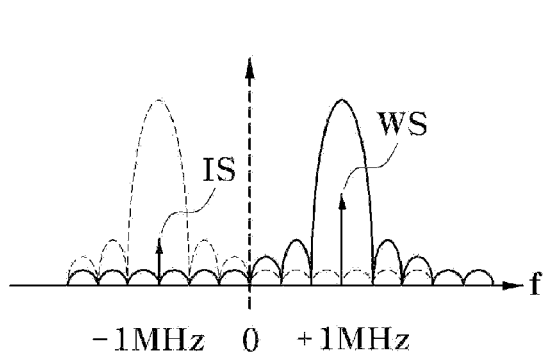
Figure 9:
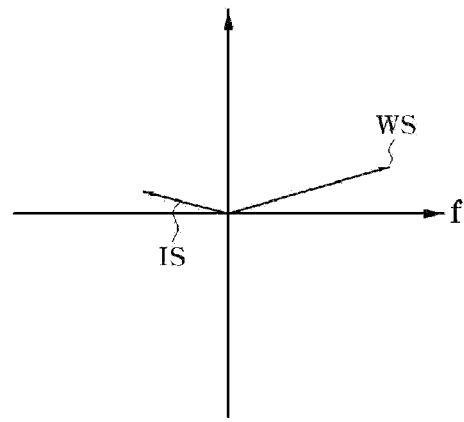

FIG. 9 is a diagram illustrating exemplary operations for measuring the second IQ imbalance (e.g., the second test period, block S12) of FIG. 7. A method embodiment for measuring the IQ imbalance is described using and may be applied to the embodiment of FIG. 1, however, such a method embodiment is not intended to be limited thereby.

A condition for measuring the second IQ imbalance is preferably identical to that of the first IQ imbalance. However, the control signal LO_ctrl is applied such that the LO signal controller 160 outputs the inputted LO signals I and Q as is during the first test period, while the control signal LO_ctrl is applied such that the signs of the gain error and the phase error of the LO signals I and Q being inputted to the LO signal controller 160 differ from those of the LO signals I' and Q' being outputted from the LO signal controller 160 during the second test period.

Description of FIGS. 9(a) through (d) is similar to that of FIGS. 8(a) through (d). However for example, equations 16 and 17 should be applied instead of equations 14 and 15 during the second test period.

$$[IIN,IQN]=(dg\_r-dg\_t)[IIP,-IQP]+(dp\_r-dp\_t)[IQP,IIP]$$ [Equation 16]

$$dg\_tr-=(dg\_r-dg\_t)=([IIN,IQN]\cdot[IIP,-IQP])/(IIP2+IQP2)$$

$$dp\_tr-=(dp\_r-dp\_t)=([IIN,IQN]\cdot[IQP,IIP])/(IIP2+IQP2)$$ [Equation 16]

The Tx IQ imbalance dg_t and dp_t and the Rx IQ imbalance dg_r and dp_r may be obtained from dg_tr+, dp_tr+, dg_tr− and dp_tr− obtained in the blocks S11 and S12.

Figure 10:
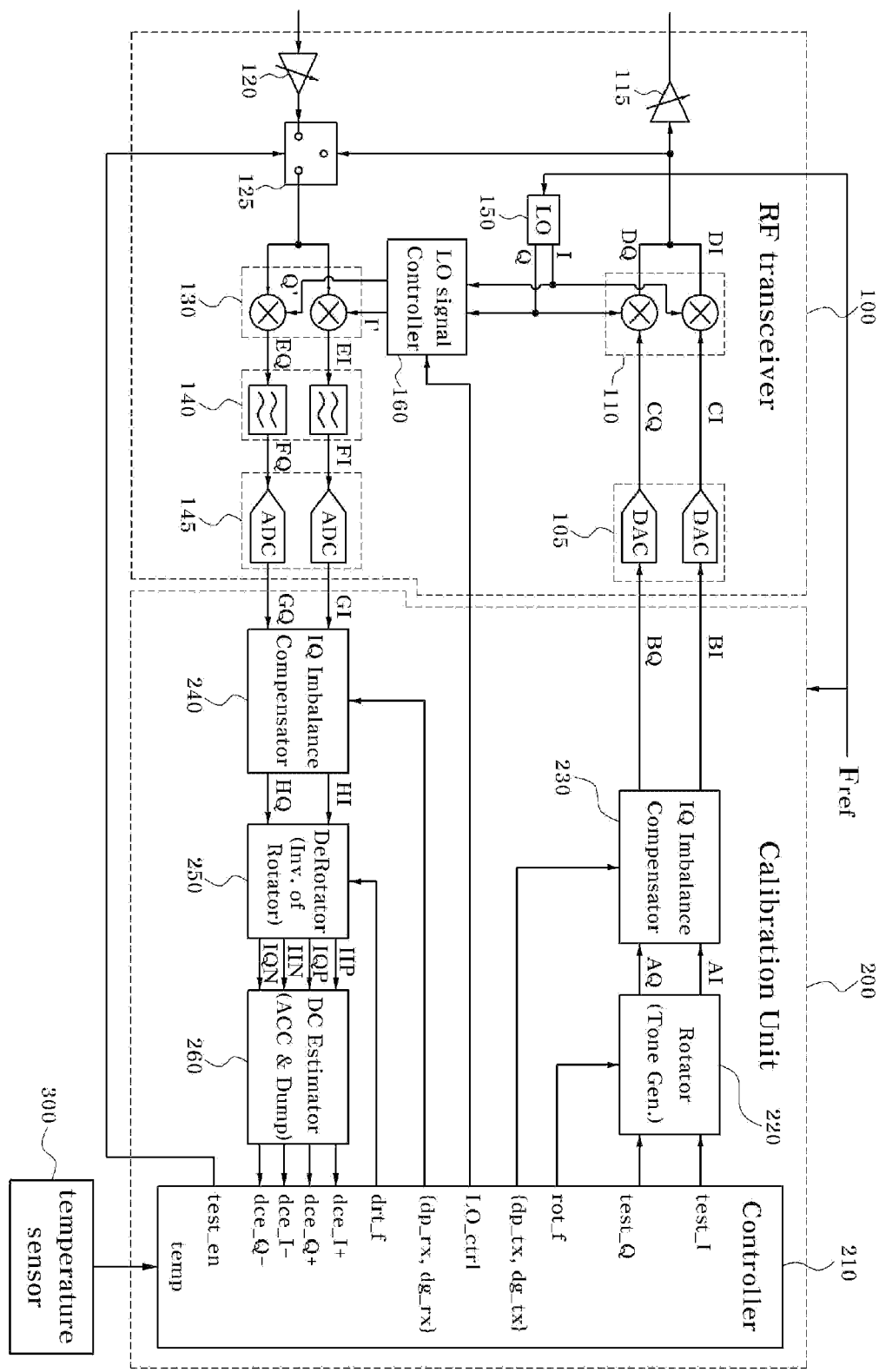
FIG. 10 is a diagram illustrating a transceiving circuit in accordance with a another embodiment of the application.

FIG. 10 is a diagram illustrating a transceiving circuit in accordance with another embodiment of the application. The transceiving circuit of FIG. 10 is similar to that of FIG. 1 except that the LO signal controller 160 can be coupled between the local oscillator 150 and the IQ down-conversion mixer 130. The transceiving circuit of FIG. 10 can determine the Tx IQ imbalance and the Rx IQ imbalance (e.g., equation 20).

Figure 11:
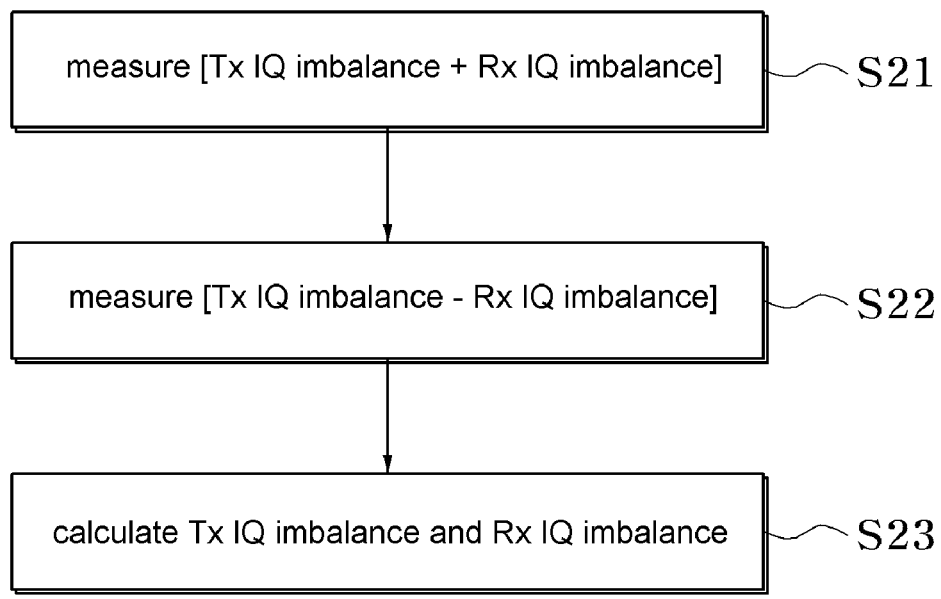
FIG. 11 is a diagram illustrating another method for measuring an IQ imbalance in accordance with an embodiment of the application.

FIG. 11 is a diagram illustrating another embodiment of method for measuring an IQ imbalance in accordance with the application. The method embodiment of FIG. 11 may be applied to the apparatus of FIG. 10, however, such a method embodiment is not intended to be limited thereby. As illustrated by FIGS. 10 and 11, the method for measuring the IQ imbalance can include measuring a first IQ imbalance, for example corresponding to [the Tx IQ imbalance+the Rx IQ imbalance] (block S21), measuring a second IQ imbalance, for example corresponding to [the Tx IQ imbalance−the Rx IQ imbalance] (block S22), and obtaining the Tx IQ imbalance and the Rx IQ imbalance from the first IQ imbalance and the second IQ imbalance (block S23). An order of the blocks S21 and S22 may be interchanged.

The block S21 can correspond to the first test period, and the first IQ imbalance measured during the first test period may be expressed as equation 18.

$$dg\_tr+=dg\_t+dg\_r$$

$$dp\_tr+=dp\_t+dp\_r$$ [Equation 18]

The block S22 can correspond to the second test period, and the second IQ imbalance measured during the second test period may be expressed as equation 19.

$$dg\_tr-=dg\_t-dg\_r$$

$$dp\_tr-=dp\_t-dp\_r$$ [Equation 19]

In the block S23, the Tx IQ imbalance dg_t and dp_t and the Rx IQ imbalance dg_r and dp_r may be obtained from the first IQ imbalance dg_tr+, dp_tr+ obtained in the block S11 and the second IQ imbalance dg_tr−, dp_tr− obtained in the block S12 as expressed in equation 20.

$$dg\_t=(dg\_tr++dg\_tr-)/2$$

$$dp\_t=(dp\_tr++dp\_tr-)/2$$

$$dg\_r=(dg\_tr+-dg\_tr-)/2$$

$$dp\_r=(dp\_tr+-dp\_tr-)/2$$ [Equation 20]

Figure 12:
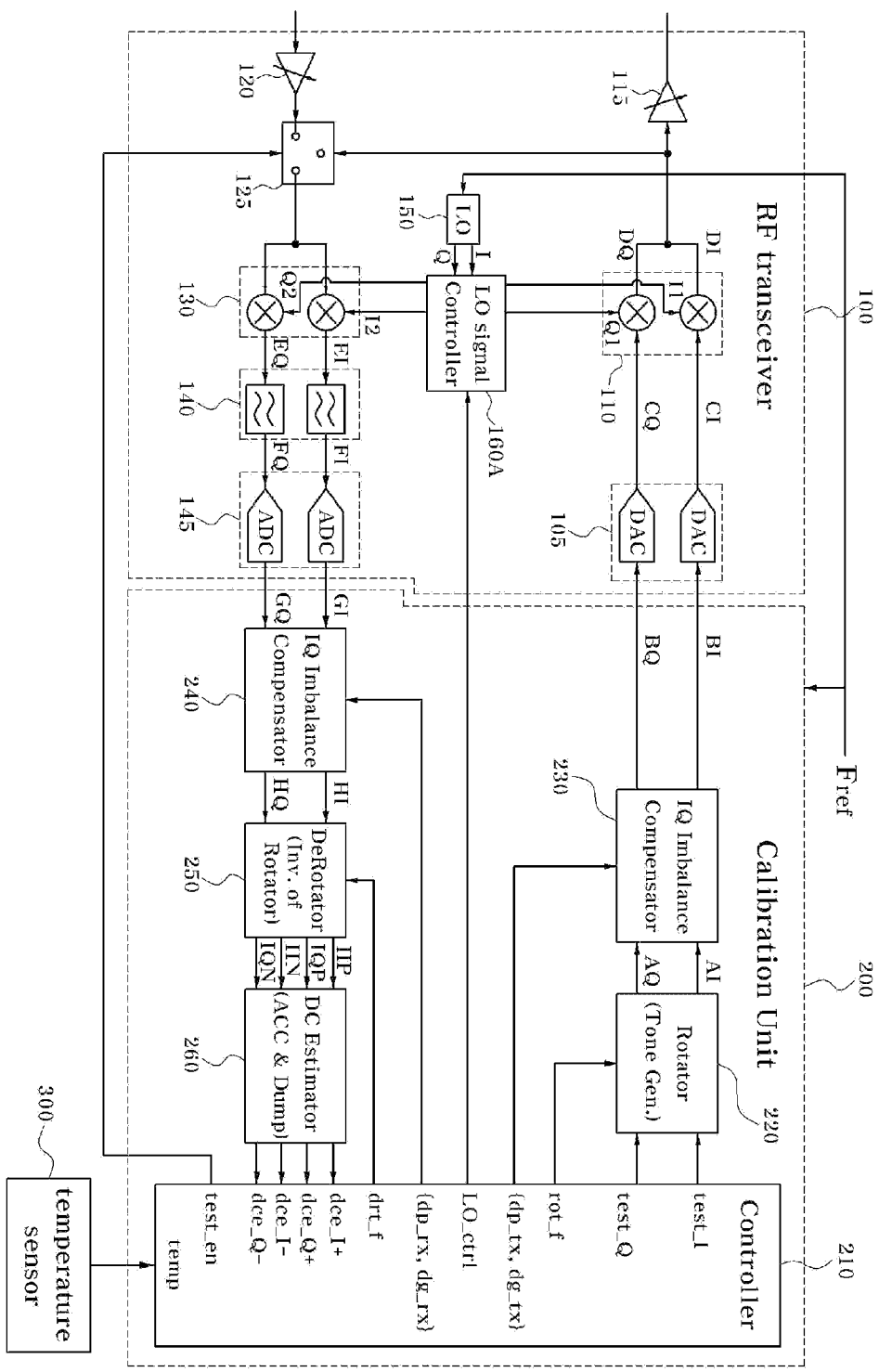
FIG. 12 is a diagram illustrating a transceiving circuit in accordance with a yet another embodiment of the application.

FIG. 12 is a diagram illustrating a transceiving circuit in accordance with one embodiment of the application, and FIGS. 13(a)-(b) are diagrams illustrating an example of an LO signal controller.

The transceiving circuit in accordance with the embodiment (e.g., third) of FIG. 12 is substantially identical to that of the embodiment of FIG. 1 except the LO signal controller 160A.

As illustrated in FIG. 12, the LO signal controller 160A can change the sign of one of an in-phase signal I1 and a quadrature signal Q1 of first LO signals I1 and Q1 transmitted to the IQ up-conversion mixer 110 and can interchange an in-phase signal I2 and a quadrature signal Q2 of second LO signals I2 and Q2 transmitted to the IQ down-conversion mixer 130 according to control such as the control signal LO_ctrl transmitted from the controller 210.

FIG. 13(a) illustrates an example of the LO signal controller 160A of FIG. 12. As illustrated by FIG. 13(a), the LO signal controller 160A can transmit the LO signals I and Q being outputted from the local oscillator 150 to the IQ up-conversion mixer 110 and the IQ down-conversion mixer 130 as is during the normal operating period and the first test period (e.g., block S11) for measuring [the Rx IQ imbalance+the Tx IQ imbalance] (e.g., I1=I, Q1=Q, I2=I and Q2=Q; the LO signal controller 160A is connected as a solid line). During the second test period (S12) for measuring [the Rx IQ imbalance−the Tx IQ imbalance], the LO signal controller 160A can transmit the in-phase signal I of the LO signals I and Q having a sign thereof changed to the IQ up-conversion mixer 110, and transmit a signal, wherein the in-phase signal I and the quadrature signal Q of the LO signals I and Q being outputted from the local oscillator 150 are interchanged, to the IQ down-conversion mixer 130 (e.g., I1=−I, Q1=Q, I2=Q, Q2=I; the LO signal controller 160A is connected as a dotted line).

FIG. 13(b) illustrates another example of the LO signal controller 160A of FIG. 12. As illustrated in FIG. 13(b), the LO signal controller 160A can transmit the LO signals I and Q being outputted from the local oscillator 150 to the IQ up-conversion mixer 110 and the IQ down-conversion mixer 130 as is during the normal operating period and the first test period (e.g., block S11) for measuring [the Rx IQ imbalance+the Tx IQ imbalance] (e.g., I1=I, Q1=Q, I2=I and Q2=Q; the LO signal controller 160A is connected as a solid line). During the second test period (e.g., block S12) for measuring [the Rx IQ imbalance−the Tx IQ imbalance], the LO signal controller 160 can transmit the quadrature signal Q of the LO signals I and Q having a sign thereof changed to the IQ up-conversion mixer 110, and transmit a signal, wherein the in-phase signal I and the quadrature signal Q of the LO signals I and Q being outputted from the local oscillator 150 are interchanged, to the IQ down-conversion mixer 130 (e.g., I1=I, Q1=−Q, I2=Q, Q2=I; the LO signal controller 160A is connected as a dotted line).

Figure 13:
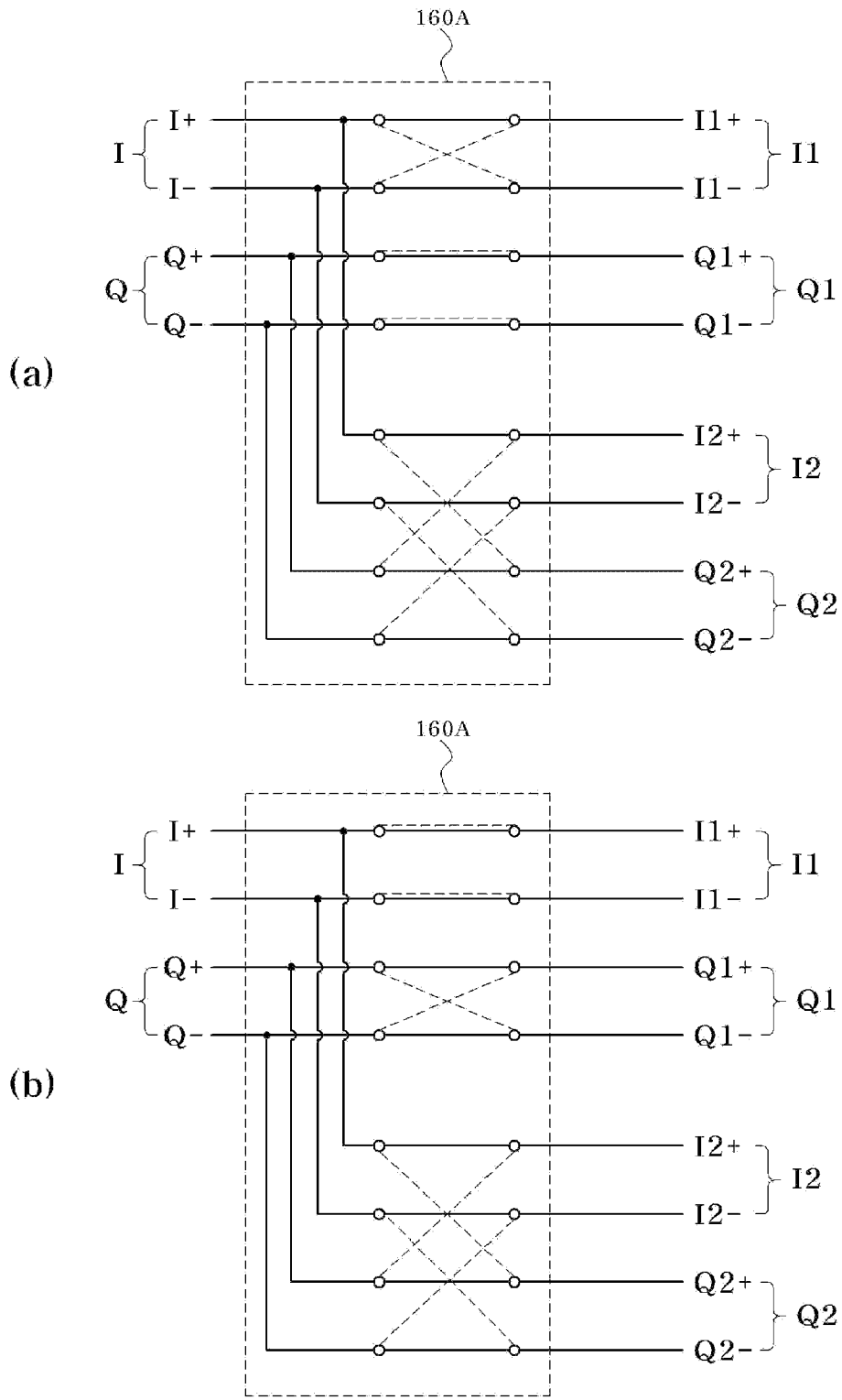
FIG. 13 is a diagram illustrating an example of an LO signal controller.

When measuring the IQ imbalance, an effect of interchanging the in-phase signal I1 and the quadrature signal Q1 of the first LO signals I1 and Q1 is same as that of interchanging the in-phase signal I2 and the quadrature signal Q2 of the second LO signals I2 and Q2. Therefore, embodiments of a method for measuring the IQ imbalance using the transceiving circuit in accordance with FIGS. 12-13 is identical to that of the embodiment of FIG. 1 except that the in-phase signal I2 and the quadrature signal Q2 of the second LO signals I2 and Q2 are interchanged instead of interchanging the in-phase signal I1 and the quadrature signal Q1 of the first LO signals I1 and Q1.

Figure 14:
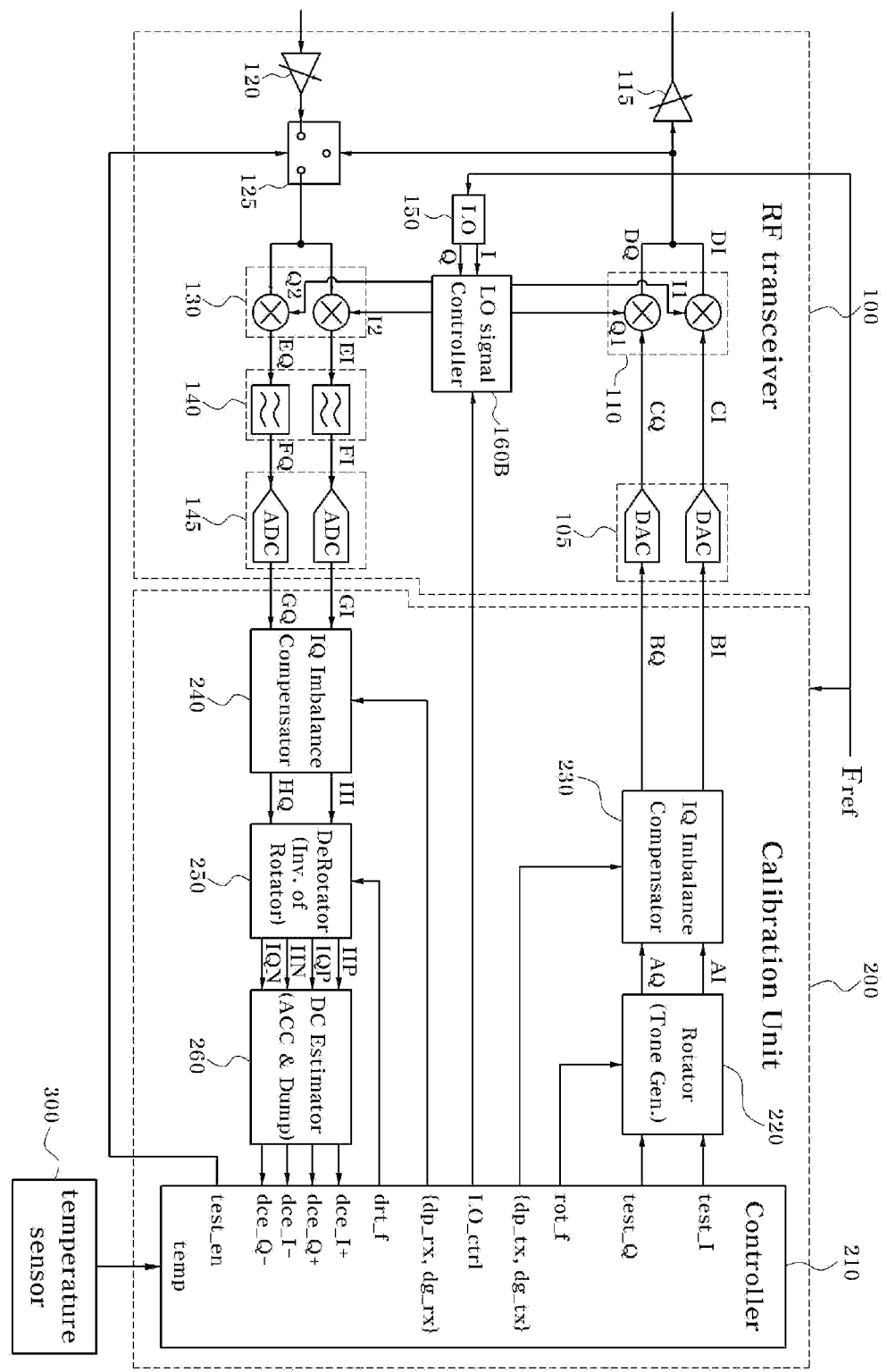
FIG. 14 is a diagram illustrating a transceiving circuit in accordance with a yet another embodiment of the application.
Figure 15:
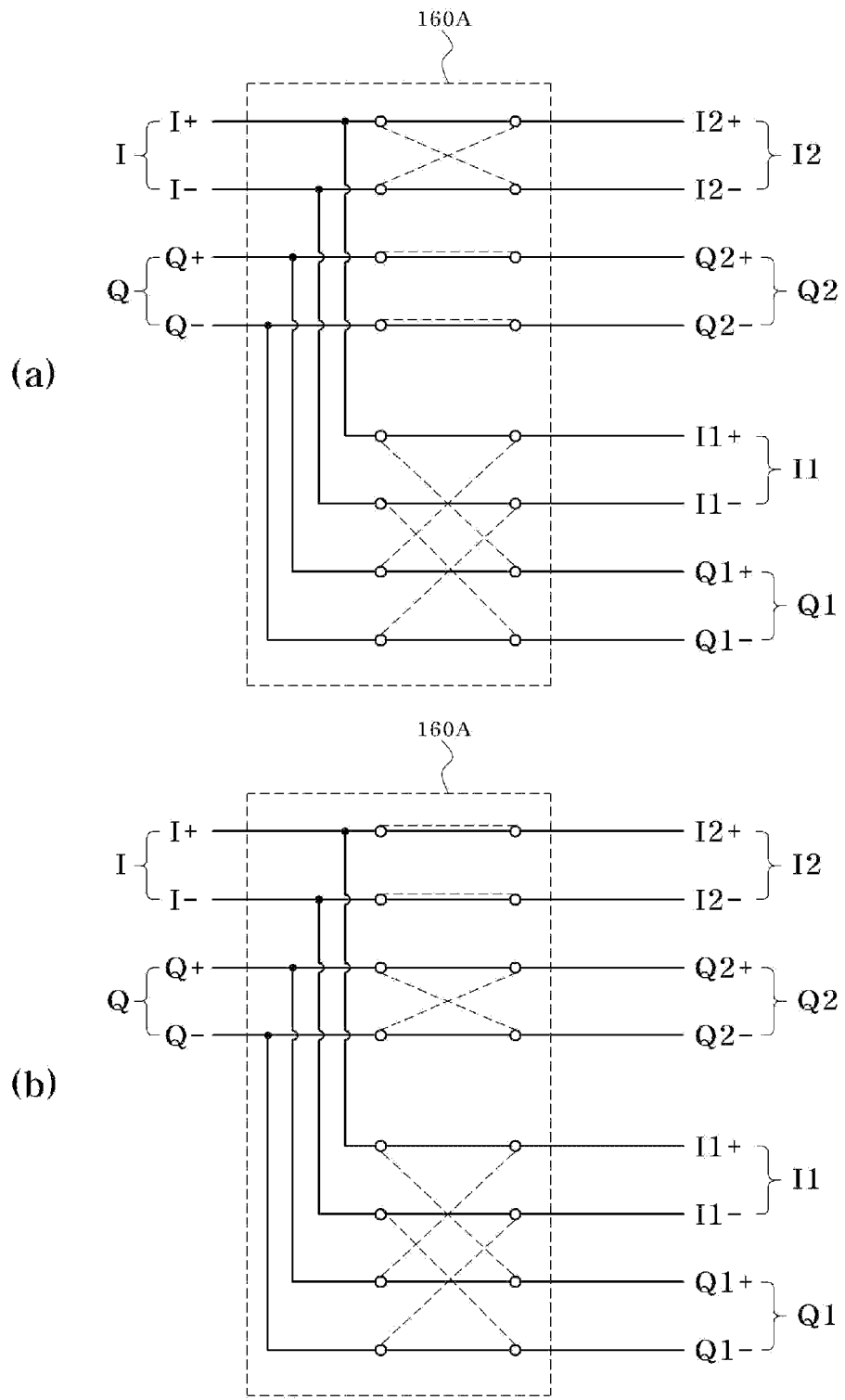
FIG. 15 is a diagram illustrating an example of an LO signal controller of FIG. 14.

FIG. 14 is a diagram illustrating a transceiving circuit in accordance with a yet another embodiment of the application, and FIG. 15 is a diagram illustrating an example of an LO signal controller of FIG. 14.

The transceiving circuit in accordance with the embodiment (e.g., fourth) of the present invention is substantially identical except the LO signal controller 160B.

As shown in FIG. 14, an exemplary LO signal controller 160B changes the sign of one of an in-phase signal I2 and a quadrature signal Q2 of second LO signals I2 and Q2 transmitted to the IQ down-conversion mixer 130 and interchanges an in-phase signal I1 and a quadrature signal Q1 of first LO signals I1 and Q1 transmitted to the IQ up-conversion mixer 110. For example, the LO signal controller can operate according to the control signal LO_ctrl transmitted from the controller 210.

FIG. 15(a) illustrates an example of the LO signal controller 160B of FIG. 14. As illustrated by FIG. 15(a), the LO signal controller 160B transmits the LO signals I and Q being outputted from the local oscillator 150 to the IQ up-conversion mixer 110 and the IQ down-conversion mixer 130 as is during the normal operating period and the first test period (e.g., block S21) for measuring [the Rx IQ imbalance+the Tx IQ imbalance] (e.g., I1=I, Q1=Q, I2=I and Q2=Q. The LO signal controller 160B is connected as a solid line). During the second test period (e.g., block S22) for measuring [the Rx IQ imbalance−the Tx IQ imbalance], the LO signal controller 160B transmits the in-phase signal I of the LO signals I and Q having a sign thereof changed to the IQ down-conversion mixer 130, and transmits a signal, wherein the in-phase signal I and the quadrature signal Q of the LO signals I and Q being outputted from the local oscillator 150 are interchanged, to the IQ up-conversion mixer 110 (e.g., I1=Q, Q1=I, I2=−I, Q2=Q. The LO signal controller 160B is connected as a dotted line).

FIG. 15(b) illustrates another example of the LO signal controller 160B of FIG. 14. Referring to FIG. 15(b), the LO signal controller 160B transmits the LO signals I and Q being outputted from the local oscillator 150 to the IQ up-conversion mixer 110 and the IQ down-conversion mixer 130 as is during the normal operating period and the first test period (e.g., block S21) for measuring [the Tx IQ imbalance+the Rx IQ imbalance] (e.g., I1=I, Q1=Q, I2=I and Q2=Q. The LO signal controller 160B is connected as a solid line). During the second test period (e.g., block S22) for measuring [the Tx IQ imbalance−the Rx IQ imbalance], the LO signal controller 160 transmits the quadrature signal Q of the LO signals I and Q having a sign thereof changed to the IQ down-conversion mixer 130, and transmits a signal, wherein the in-phase signal I and the quadrature signal Q of the LO signals I and Q being outputted from the local oscillator 150 are interchanged, to the IQ up-conversion mixer 110 (e.g., I1=Q, Q1=I, I2=I, Q2=−Q. The LO signal controller 160B is connected as a dotted line).

When measuring the IQ imbalance, an effect of interchanging the in-phase signal I1 and the quadrature signal Q1 of the first LO signals I1 and Q1 is substantially the same as interchanging the in-phase signal I2 and the quadrature signal Q2 of the second LO signals I2 and Q2. Therefore, the method for measuring the IQ imbalance using the transceiving circuit of FIG. 14 is similar to the embodiment of FIG. 1 except that the in-phase signal I1 and the quadrature signal Q1 of the first LO signals I1 and Q1 are interchanged instead of interchanging the in-phase signal I2 and the quadrature signal Q2 of the second LO signals I2 and Q2.

Figure 16:
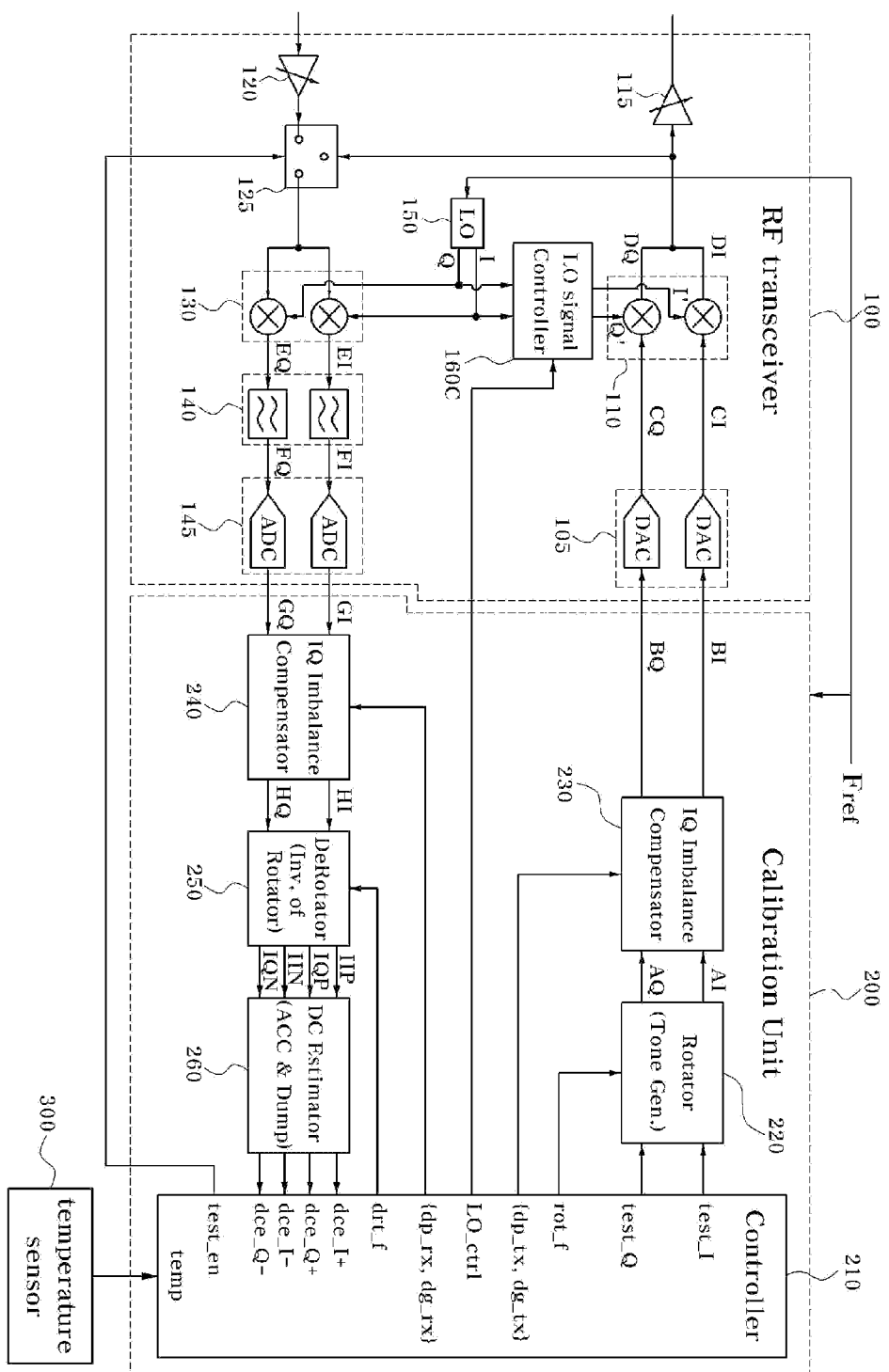
FIG. 16 is a diagram illustrating a transceiving circuit in accordance with a still yet another embodiment of the v.
Figure 17:
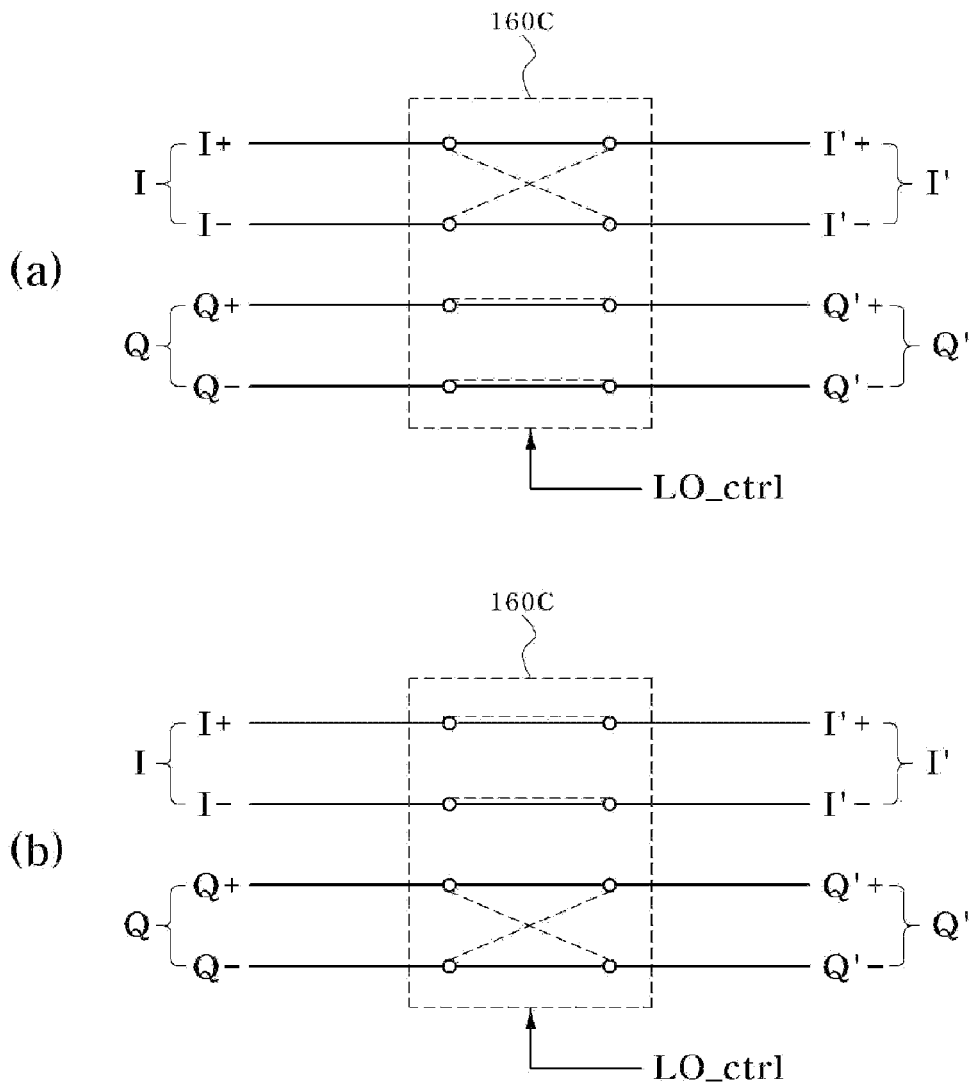
FIG. 17 is a diagram illustrating an example of an LO signal controller of FIG. 16.

FIG. 16 is a diagram illustrating a transceiving circuit in accordance with a another embodiment of the application, and FIG. 17 is a diagram illustrating an example of an LO signal controller 160C of FIG. 16.

The transceiving circuit in accordance with the embodiment of FIG. 16 is substantially identical to that of the embodiment of FIG. 1 except the LO signal controller 160C and an operation of the rotator 220 during the second test period (e.g., block S12) for measuring [the Rx IQ imbalance−the Tx IQ imbalance].

As shown in FIG. 16, the LO signal controller 160C can change the sign of one of an in-phase signal I' and a quadrature signal Q' of LO signals I' and Q' transmitted to the IQ up-conversion mixer 110.

FIG. 17(a) illustrates an example of the LO signal controller 160C of FIG. 16. As illustrated in FIG. 17(a), the LO signal controller 160C can transmit the LO signals I and Q being outputted from the local oscillator 150 to the IQ up-conversion mixer 110 as is during the normal operating period and the first test period (e.g., block S11) for measuring [the Tx IQ imbalance+the Rx IQ imbalance] (e.g., I'=I, Q'=Q. The LO signal controller 160C is connected as a solid line). During the second test period (e.g., block S12) for measuring [the Tx IQ imbalance−the Rx IQ imbalance], the LO signal controller 160C transmits the in-phase signal I of the LO signals I and Q having a sign thereof changed to the IQ up-conversion mixer 110 (e.g., I'=−I, Q'=Q. The LO signal controller 160C is connected as a dotted line).

FIG. 17(b) illustrates another example of the LO signal controller 160C of FIG. 16. As illustrated in FIG. 17(b), the LO signal controller 160C can transmit the LO signals I and Q being outputted from the local oscillator 150 to the IQ up-conversion mixer 110 and the IQ down-conversion mixer 130 as is during the normal operating period and the first test period (e.g., block S11) for measuring [the Rx IQ imbalance+the Tx IQ imbalance] (e.g., I1=I, Q1=Q, I2=I and Q2=Q. The LO signal controller 160C is connected as a solid line). During the second test period (e.g., block S12) for measuring [the Rx IQ imbalance−the Tx IQ imbalance], the LO signal controller 160C can transmit the quadrature signal Q of the LO signals I and Q having a sign thereof changed to the IQ up-conversion mixer 110 (e.g., I'=I, Q'=−Q. The LO signal controller 160C is connected as a dotted line).

When measuring the IQ imbalance, an effect of changing the sign of the angular frequency of IQ signals AI and AQ being outputted from the rotator 220 is preferably substantially the same as that of interchanging the in-phase signal I' and the quadrature signal Q' of the LO signals I' and Q' inputted to the IQ up-conversion mixer 110. Therefore, a method for measuring the IQ imbalance using the transceiving circuit in accordance with the embodiment of FIG. 16 is identical to that of the embodiment of FIG. 1 except that the sign of the angular frequency of the IQ signals AI and AQ being outputted from the rotator 220 is changed instead of interchanging the in-phase signal I' and the quadrature signal Q' of the LO signals I' and Q' inputted to the IQ up-conversion mixer 110.

Figure 18:
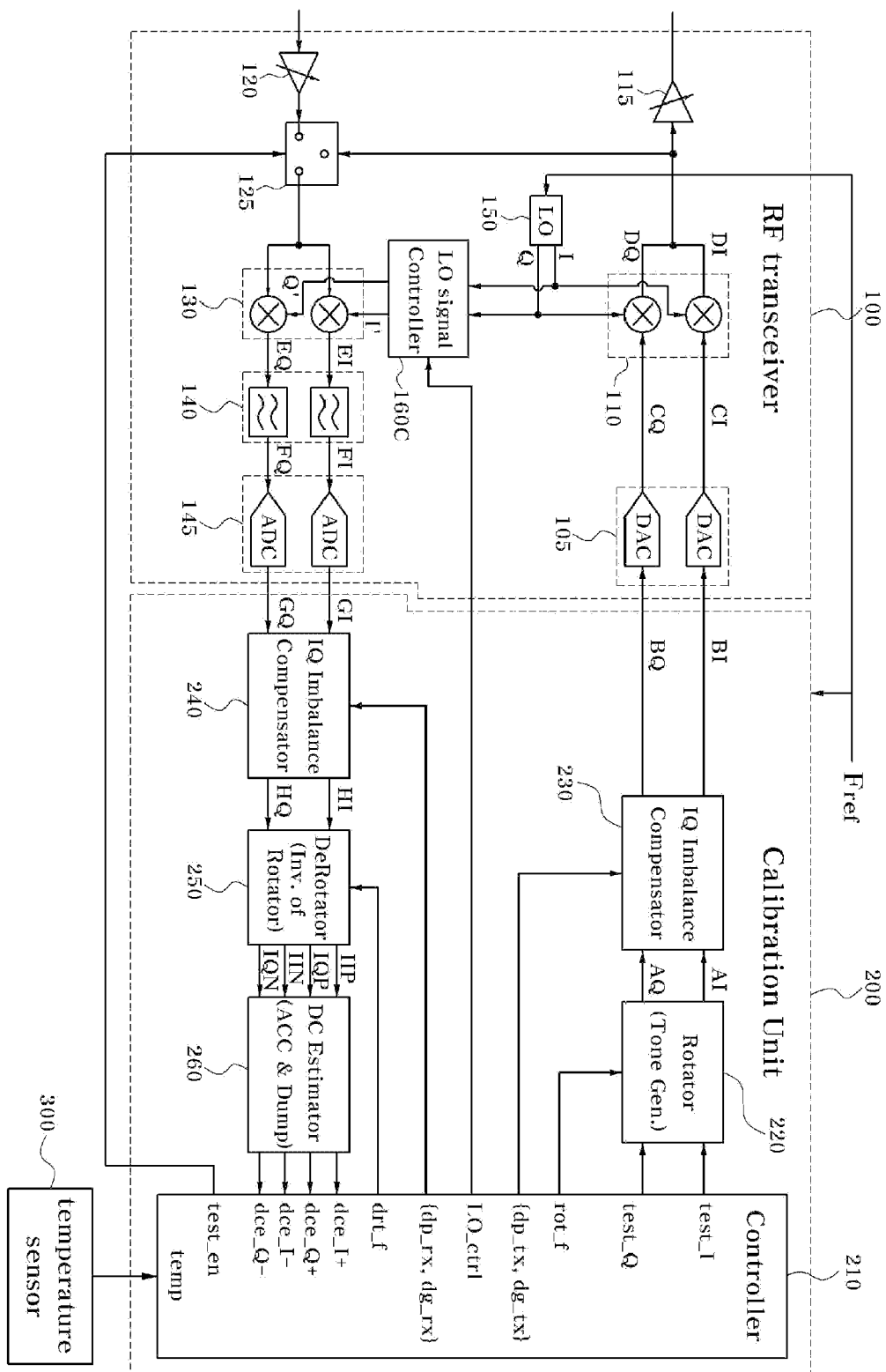
FIG. 18 is a diagram illustrating a transceiving circuit in accordance with still yet another embodiment of the application.

FIG. 18 is a diagram illustrating a transceiving circuit in accordance with another embodiment of the application.

The transceiving circuit FIG. 18 is substantially identical to that of the embodiment of FIG. 10 except an LO signal controller 160C and an operation of the rotator 220 during the second test period (e.g., block S22) for measuring [the Tx IQ imbalance−the Rx IQ imbalance].

As shown in FIG. 18, the LO signal controller 160C changes the sign of one of an in-phase signal I' and a quadrature signal Q' of LO signals I' and Q' transmitted to the IQ down-conversion mixer 130. FIG. 17 illustrates an example of the LO signal controller 160C. As illustrated in FIG. 17, the LO signal controller 160C is connected as shown in the solid line during the normal operating period and the first test period (e.g., block S21) for measuring [the Tx IQ imbalance+the Rx IQ imbalance], the LO signal controller 160C is connected as shown in the dotted line during the second test period (e.g., block S22) for measuring [the Tx IQ imbalance–the Rx IQ imbalance].

When measuring the IQ imbalance, an effect of changing the sign of the angular frequency of IQ signals AI and AQ being outputted from the rotator 220 is substantially the same as that of interchanging the in-phase signal I' and the quadrature signal Q' of the LO signals I' and Q' inputted to the IQ down-conversion mixer 130. Therefore, the method for measuring the IQ imbalance using the transceiving circuit in accordance with FIG. 18 (e.g., sixth embodiment) is identical to that of the embodiment of FIG. 10 except that the sign of the angular frequency of the IQ signals AI and AQ being outputted from the rotator 220 is changed instead of interchanging the in-phase signal I' and the quadrature signal Q' of the LO signals I' and Q' inputted to the IQ down-conversion mixer 130.

As described above, embodiments of apparatuses and methods for measuring the IQ imbalance in accordance with the present general inventive concept have various advantages. For example, the Tx IQ imbalance may be measured as well as the Rx IQ imbalance according to embodiments.

In addition, embodiments of apparatuses and methods for measuring the IQ imbalance can input the output signal of the IQ up-conversion mixer to the IQ down-conversion mixer (e.g., rather than measuring the IQ imbalance using the signal received through the wireless communication and/or a separate test signal such as to the IQ down-conversion mixer).

Moreover, embodiments of apparatuses and methods for measuring the IQ imbalance can use additional LO signal controller to measure the Tx IQ imbalance and the Rx IQ imbalance.

In addition, embodiments of apparatuses and methods for measuring the IQ imbalance can obtain the IQ imbalance with an image signal due to the IQ imbalance using the derotator and the DC estimator to measure the IQ imbalance.

Further, embodiments of apparatuses and methods for measuring the IQ imbalance can reduce a time for measurement and compensation of an IQ imbalance (e.g., with increased relative accuracy).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

Although embodiments of the present general inventive concept have been illustrated and described, it would be appreciated by those skilled in the art that changes may be made in these embodiments without departing from the principles and spirit of the general inventive concept, the scope of which is defined in the claims and their equivalents. As used in this disclosure, the term "preferably" is non-exclusive and means "preferably, but not limited to." Terms in the claims should be given their broadest interpretation consistent with the general inventive concept as set forth in this description. For example, the terms "coupled" and "connect" (and derivations thereof) are used to connote both direct and indirect connections/couplings. As another example, "having" and "including", derivatives thereof and similar transitional terms or phrases are used synonymously with "comprising" (i.e., all are considered "open ended" terms)—only the phrases "consisting of" and "consisting essentially of" should be considered as "close ended". Claims are not intended to be interpreted under 112 sixth paragraph unless the phrase "means for" and an associated function appear in a claim and the claim fails to recite sufficient structure to perform such function.

What is claimed is:

1. A method for measuring a Tx in-phase and quadrature (IQ) imbalance generated in an IQ up-conversion mixer and an Rx IQ imbalance generated in an IQ down-conversion mixer, the method comprising:
   (a) measuring a first IQ imbalance corresponding to the Rx IQ imbalance+the Tx IQ imbalance;
   (b) measuring a second IQ imbalance corresponding to the Rx IQ imbalance–the Tx IQ imbalance; and
   (c) obtaining the Tx IQ imbalance and the Rx IQ imbalance from the first IQ imbalance and the second IQ imbalance,
   wherein the Tx IQ lance and the Rx IQ imbalance obtained in step (c) correspond to equations $dg\_t=(dg\_tr+-dg\_tr-)/2;$ $dp\_t=(dp\_tr+-dp\_tr-)/2;$ $dg\_r=(dg\_tr++dg\_tr-)/2;$ and $dp\_r=(dp\_tr++dp\_tr-)/2,$ where dg_tr+ and dp_tr+ are a gain error and a phase error of the first IQ imbalance, respectively dg_tr– and dp_tr– are a gain error and a phase error of the second IQ imbalance, respectively, dg_t and dp_t are a gain error and a phase error of the Tx IQ imbalance, respectively, and dg_r and dp_r are a gain error and a phase error of the Rx IQ imbalance, respectively.

2. The method in accordance with claim 1, wherein measuring the first IQ imbalance includes determining a first gain error and a separate first phase error, and measuring the second IQ imbalance includes determining a second gain error and a separate second phase error.

3. The method in accordance with claim 1, further comprising:
   providing a first local oscillator (LO) signal to the IQ up conversion mixer, and providing a second local oscillator (LO) signal to the IQ down conversion mixer, and
   providing a first IQ signal, second IQ signal, and third IQ signal, wherein the first IQ signal is an input IQ signal of the IQ up-conversion mixer, the second IQ signal is an output IQ signal of the IQ up-conversion mixer, and the third IQ signal is an output IQ signal of the IQ down-conversion mixer,
   wherein a sum of an I component signal and a Q component signal of the second IQ signal is inputted to the IQ down-conversion mixer and an angular frequency of the second LO signal is equal to an angular frequency of the first LO signal in the steps (a) and (b),
   wherein the first IQ signal has a first angular frequency in the step (a) and a second angular frequency the same as or different from the first angular frequency in the step (b), wherein the step (a) comprises (a1) obtaining a fourth IQ signal and a fifth IQ signal by derotating an IQ signal derived from the third IQ signal by +(the first angular frequency) and −(the first angular frequency), respectively; and (a2) obtaining the first IQ imbalance from the fourth IQ signal and the fifth IQ signal, and wherein the step (b) comprises (b1) obtaining a sixth IQ signal and a seventh IQ signal by derotating the IQ signal derived from the third IQ signal by +(the second angular frequency) and −(the second angular frequency), respectively; and (b2) obtaining the second IQ imbalance from the sixth IQ signal and the seventh IQ signal.

4. The method in accordance with claim 3, wherein I4 corresponds to

[I3×cos(Δωxt)−Q3×sin(Δω1×t)]; Q4 corresponds to [I3×sin(Δω1×t)+Q3×cos(Δωxt)]; I5 corresponds to [I3×cos(Δω1×t)+Q3×sin(Δω1×t)]; Q5 corresponds to [−I3×sin(Δω1×t)+Q3×cos(Δω1×t)]; I6 corresponds to [I3×cos(Δω2×t)−Q3×sin(Δω2×t)]; Q6 corresponds to [I3×sin(Δω2×t)+Q3×cos(Δω2×t)]; I7 corresponds to [I3×cos(Δω2×t)+Q3×sin(Δω2×t)]; and Q7 corresponds to [−I3×sin(Δω2×t)+Q3×cos(Δω2×t)], where I3 and Q3 are an I component signal and a Q component signal of the third IQ signal, respectively, I4 and Q4 are an I component signal and a Q component signal of the fourth IQ signal, respectively, I5 and Q5 are an I component signal and a Q component signal of the fifth IQ signal, respectively, I6 and Q6 are an I component signal and a Q component signal of the sixth IQ signal, respectively, I7 and Q7 are an I component signal and a Q component signal of the seventh IQ signal, respectively, and Δω1 and Δω2 are the first angular frequency and the second angular frequency, respectively.

5. The method in accordance with claim 3, wherein a gain error of the first IQ imbalance corresponds to [(I4×I5−Q4×Q5)÷(I4$^2$+Q4$^2$)]; a phase error of the first IQ imbalance corresponds to [(I4×Q5+Q4×I5)÷(I4$^2$+Q4$^2$)]; a gain error of the second IQ imbalance corresponds to [(I6×I7−Q6×Q7)÷(I6$^2$+Q6$^2$)]; and a phase error of the second IQ imbalance corresponds to [(I6×Q7+Q6×I7)÷(I6$^2$+Q6$^2$)]; where I4 and Q4 are an I component signal and a Q component signal of the fourth IQ signal, respectively, I5 and Q5 are an I component signal and a Q component signal of the fifth IQ signal, respectively, I6 and Q6 are an I component signal and a Q component signal of the sixth IQ signal, respectively, and I7 and Q7 are an I component signal and a Q component signal of the seventh IQ signal, respectively.

6. The method in accordance with claim 3, wherein a relationship between I1 and Q1, and I1' and Q1' is expressed as an equation $$I1'=I1, Q1'=-Q1; \text{ or}$$

$$I1'=-I1, Q1'=Q1,$$

wherein I1 and Q1 are an in-phase signal and a quadrature signal of the first LO signal in the step (a), respectively, and I1' and Q1' are the in-phase signal and the quadrature signal of the first LO signal in the step (b), respectively, and wherein a sign of the second angular frequency is different from a sign of the first angular frequency.

7. The method in accordance with claim 3, wherein:
a relationship between I1 and Q1, and I1' and Q1' is expressed as an equation $$I1'=Q1, Q1'=-I1; \text{ or}$$

$$I1'=-Q1, Q1'=I1,$$

wherein I1 and Q1 are an in-phase signal and a quadrature signal of the first LO signal in the step (a), respectively, and I1' and Q1' are the in-phase signal and the quadrature signal of the first LO signal in the step (b), respectively.

8. The method in accordance with claim 3, wherein a relationship between I1 and Q1, and I1' and Q1' is expressed as an equation $$I1'=I1; Q1'=-Q1; \text{ or}$$

$$I1'=-I1, Q1'=Q1, \text{ and}$$

a relationship between I2 and Q2, and I2' and Q2' is expressed as an equation $$I2'=Q2, Q2'=I2,$$

wherein I1 and Q1 are an in-phase signal and a quadrature signal of the first LO signal in the step (a), respectively, I1' and Q1' are the in-phase signal and the quadrature signal of the first LO signal in the step (b), respectively, I2 and Q2 are an in-phase signal and a quadrature signal of the second LO signal in the step (a), respectively, and I2' and Q2' are the in-phase signal and the quadrature signal of the second LO signal in the step (b), respectively.

9. A method for measuring a Tx in-phase and quadrature (IQ) imbalance generated in an IQ up-conversion mixer and an Rx IQ imbalance generated in an IQ down-conversion mixer, the method comprising:
(a) measuring a first IQ imbalance corresponding to the Tx IQ imbalance+the Rx IQ imbalance;
(b) measuring a second IQ imbalance corresponding to the Tx IQ imbalance−the Rx IQ imbalance; and
(c) obtaining the Tx IQ imbalance and the Rx IQ imbalance from the first IQ imbalance and the second IQ imbalance,
wherein the Tx IQ imbalance and the Rx IQ imbalance obtained in step (c) correspond to equations $$dg\_t=(dg\_tr++dg\_tr-)/2;$$

$$dp\_t=(dp\_tr++dp\_tr-)/2;$$

$$dg\_r=(dg\_tr+-dg\_tr-)/2; \text{ and}$$

$$dp\_r=(dp\_tr+-dp\_tr-)/2,$$

where dg_tr+ and dp_tr+ are a gain error and a phase error of the first IQ imbalance, respectively dg_tr− and dp_tr− are a gain error and a phase error of the second IQ imbalance, respectively, dg_t and dp_t are a gain error and a phase error of the Tx IQ imbalance, respectively, and dg_r and dp_r are a gain error and a phase error of the Rx IQ imbalance, respectively.

10. The method in accordance with claim 9, wherein measuring the first IQ imbalance includes determining a first gain error and a separate first phase error, and measuring the second IQ imbalance includes determining a second gain error and a separate second phase error.

11. The method in accordance with claim 9, further comprising:
providing a first local oscillator (LO) signal to the IQ up conversion mixer, and providing a second local oscillator (LO) signal to the IQ down conversion mixer, and
providing a first IQ signal, second IQ signal, and third IQ signal, wherein the first IQ signal is an input IQ signal of the IQ up-conversion mixer, the second IQ signal is an output IQ signal of the IQ up-conversion mixer, and the third IQ signal is an output IQ signal of the IQ down-conversion mixer, wherein a sum of an I component signal and a Q component signal of the second IQ signal is inputted to the IQ down-conversion mixer and an angular frequency of the second LO signal is same as that of the first LO signal in the steps (a) and (b), wherein the first IQ signal has a first angular frequency in the step (a) and a second angular frequency same as or different from the first angular frequency in the step (b);

wherein the step (a) comprises (a1) obtaining a fourth IQ signal and a fifth IQ signal by derotating the third IQ signal by +(the first angular frequency) and −(the First angular frequency), respectively; and (a2) obtaining the first IQ imbalance from the fourth IQ signal and the fifth IQ signal, and wherein the step (b) comprises (b1) obtaining a sixth IQ signal and a seventh IQ signal by derotating the third IQ signal by +(the second angular frequency) and −(the second angular frequency); respectively; and (b2) obtaining the second IQ imbalance from the sixth IQ signal and the seventh IQ signal.

12. The method in accordance with claim 11 wherein I4 corresponds to (I3×cos($\Delta\omega$1×t)−Q3×sin($\Delta\omega$1×t)); Q4 corresponds to (I3×sin($\Delta\omega$1×t)+Q3×cos($\Delta\omega$1×t)); I5 corresponds to (I3×cos($\Delta\omega$1×t)+Q3×sin($\Delta\omega$1×t)); Q5 corresponds to (−I3×sin($\Delta\omega$1×t)+Q3×cos($\Delta\omega$1×t)); I6 corresponds to (I3×cos($\Delta\omega$2×t)−Q3×sin($\Delta\omega$2×t)); Q6 corresponds to (I3×sin $\Delta\omega$2×t)+Q3×cos($\Delta\omega$2×t)); I7 corresponds to (I3×cos($\Delta\omega$2×t)+Q3×sin($\Delta\omega$2×t)); and Q7 corresponds to (−I3×sin($\Delta\omega$2×t)+Q3×cos($\Delta\omega$2×t)), where I3 and Q3 are an I component signal and a Q component signal of the third IQ signal, respectively, I4 and Q4 are an I component signal and a Q component signal of the fourth IQ signal, respectively, I5 and Q5 are an I component signal and a Q component signal of the fifth IQ signal, respectively, I6 and Q6 are an I component signal and a Q component signal of the sixth IQ signal, respectively, I7 and Q7 are an I component signal and a Q component signal of the seventh IQ signal, respectively, and $\Delta\omega$1 and $\Delta\omega$2 are the first angular frequency and the second angular frequency, respectively.

13. The method in accordance with claim 11 wherein a gain error of the first IQ imbalance corresponds to ((I4×I5−Q4×Q5)÷(I4$^2$+Q4$^2$)); a phase error of the first IQ imbalance corresponds to ((I4×Q5+Q4×I5)÷(I4$^2$+Q4$^2$)); a gain error of the second IQ imbalance corresponds to ((I6×I7−Q6×Q7)÷(I6$^2$+Q6$^2$)); and a phase error of the second IQ imbalance corresponds to ((I6×Q7+Q6×I7)÷(I6$^2$+Q6$^2$)), where I4 and Q4 are an I component signal and a Q component signal of the fourth IQ signal, respectively, I5 and Q5 are an I component signal and a Q component signal of the fifth IQ signal, respectively, I6 and Q6 are an I component signal and a Q component signal of the sixth IQ signal, respectively, and I7 and Q7 are an I component signal and a Q component signal of the seventh IQ signal, respectively.

14. The method in accordance with claim 11, wherein a relationship between I2 and Q2, and I2' and Q2' is expressed as an equation $I2'=I2, Q2'=-Q2$; or $I2'=-I2, Q2'=Q2$, wherein I2 and Q2 are an in-phase signal and a quadrature signal of the second LO signal in the step (a), respectively, and I2' and Q2' are the in-phase signal and the quadrature signal of the second LO signal in the step (b), respectively.

15. The method in accordance with claim 11, wherein a relationship between I2 and Q2, and I2' and Q2' is expressed as an equation $I2'=Q2, Q2'=-I2$; or $I2'=-Q2, Q2'=I2$, wherein I2 and Q2 are an in-phase signal and a quadrature signal of the second LO signal in the step (a), respectively, and I2' and Q2' are the in-phase signal and the quadrature signal of the second LO signal in the step (b), respectively.

16. The method in accordance with claim 11, wherein a relationship between I2 and Q2, and I2' and Q2' is expressed as an equation $I2'=I2, Q2'=-Q2$; or $I2'=-I2, Q2'=Q2$, and a relationship between I1 and Q1, and I1' and Q1' is expressed as an equation $I1'=Q1, Q1'=I1$, wherein I1 and Q1 are an in-phase signal and a quadrature signal of the first LO signal in the step (a), respectively, I1' and Q1' are the in-phase signal and the quadrature signal of the first LO signal in the step (b), respectively, I2 and Q2 are an in-phase signal and a quadrature signal of the second LO signal in the step (a), respectively, and I2' and Q2' are the in-phase signal and the quadrature signal of the second LO signal in the step (b), respectively.

17. An apparatus for measuring an in-phase and quadrature (IQ) imbalance, the apparatus comprising:
an IQ up-conversion mixer to output a second IQ signal obtained by multiplying a first IQ signal to a first LO signal;
an IQ down-conversion mixer to output a third IQ signal obtained by multiplying a sum of an I component signal and a Q component signal of the second IQ signal to a second LO signal, an angular frequency of the first LO signal to be substantially equal the second LO signal;
an LO signal controller circuit operable to result in signal change of at least one of a sign of one of an in-phase signal and a quadrature signal of the first LO signal or the second LO signal, or the signal change of at least one of interchange of the in-phase signal and the quadrature signal of the first LO signal or the second LO signal; and
an IQ imbalance detector for providing the first IQ signal having an angular frequency to the IQ up-conversion mixer, applying the control signal to the LO signal controller, and obtaining a TX IQ imbalance and an Rx IQ imbalance from the third IQ signal.

18. The method in accordance with claim 1, wherein measuring the first IQ imbalance includes measuring the first IQ imbalance during a first test period, and measuring the second IQ imbalance includes measuring the second IQ imbalance during a second test period.

19. The method in accordance with claim 9, wherein measuring the first IQ imbalance includes measuring the first IQ imbalance during a first test period, and measuring the second IQ imbalance includes measuring the second IQ imbalance during a second test period.

* * * * *